US012583450B2

(12) United States Patent (10) Patent No.: US 12,583,450 B2
Adachi et al. (45) Date of Patent: Mar. 24, 2026

(54) VEHICLE CONTROL DEVICE

(71) Applicant: Mitsubishi Electric Corporation, Tokyo (JP)

(72) Inventors: Kota Adachi, Tokyo (JP); Takayuki Tanaka, Tokyo (JP); Mizuki Higuchi, Tokyo (JP); Shogo Okamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 4 days.

(21) Appl. No.: 18/790,411

(22) Filed: Jul. 31, 2024

(65) Prior Publication Data

US 2025/0083674 A1 Mar. 13, 2025

(30) Foreign Application Priority Data

Sep. 11, 2023 (JP) ................................. 2023-146643

(51) Int. Cl.
  B60W 30/14 (2006.01)
  G06V 20/58 (2022.01)
  H04W 4/40 (2018.01)
(52) U.S. Cl.
  CPC ........... B60W 30/146 (2013.01); G06V 20/58 (2022.01); H04W 4/40 (2018.02); B60W 2554/402 (2020.02); B60W 2554/4041 (2020.02); B60W 2554/4042 (2020.02); B60W 2555/60 (2020.02)

(58) Field of Classification Search
  CPC ........................... G06V 20/58; B60W 2556/10
  See application file for complete search history.

(56) References Cited

U.S. PATENT DOCUMENTS

| 12,263,864 B2 * | 4/2025 | Itsui ...................... B60W 60/00 |
| 2013/0223686 A1 * | 8/2013 | Shimizu .................. G06T 7/246 |
| | | 382/103 |
| 2022/0223059 A1 * | 7/2022 | Kawiecki ................. G08G 5/34 |

FOREIGN PATENT DOCUMENTS

| EP | 3467545 A1 * | 4/2019 | ............. G01S 17/66 |
| JP | 3147541 B2 | 3/2001 | |

* cited by examiner

*Primary Examiner* — Tarek Elarabi
(74) *Attorney, Agent, or Firm* — Sughrue Mion, PLLC

(57) ABSTRACT

A vehicle control device includes: an in-vehicle sensor information acquisition unit; a roadside sensor information acquisition unit; a vehicle position information acquisition unit; a map information acquisition unit; an obstacle information generation unit that generates obstacle information including information of at least one of a position, a size and a speed of the obstacle and information of a type of the obstacle, on the basis of the in-vehicle sensor information, the roadside sensor information and the vehicle position information; and an obstacle responsive control unit that determines whether or not to execute obstacle responsive control, on the basis of the obstacle information and an obstacle-presence possibility list for respective types of obstacles, and then, when determined to execute the obstacle responsive control, controls the vehicle in response to the obstacle.

13 Claims, 24 Drawing Sheets

FIG.5

| TYPE＼REGION | GETTING ON/OFF AREA | SIDEWALK | BUS BAY | REFUGE BAY | ORDINARY ROAD | FREEWAY |
|---|---|---|---|---|---|---|
| HUMAN | 1 | 1 | 1 | 1 | 1 | 0 |
| VEHICLE (THREE OR MORE WHEELED) | 0 | 0 | 1 | 1 | 1 | 1 |
| MOTORCYCLE | 0 | 0 | 1 | 1 | 1 | 1 |
| BICYCLE | 0 | 1 | 1 | 1 | 1 | 0 |
| OTHER OBJECT | 1 | 1 | 1 | 1 | 1 | 1 |

FIG.7

| TYPE \ TOTAL LENGTH | < | 20m | 10m | 2.5m | 1.0m | 0.5m | 0.3m |
| --- | --- | --- | --- | --- | --- | --- | --- |
| | ≧ | 20m | 10m | 2.5m | 1.0m | 0.5m | 0.3m | — |
| HUMAN | | 0 | 0 | 0 | 1 | 1 | 1 | — |
| VEHICLE (THREE OR MORE WHEELED) | | 0 | 1 | 1 | 1 | 0 | 0 | 0 |
| MOTORCYCLE | | 0 | 0 | 0 | 1 | 0 | 0 | 0 |
| BICYCLE | | 0 | 0 | 0 | 1 | 0 | 0 | 0 |
| OTHER OBJECT | | 1 | 1 | 1 | 1 | 1 | 1 | 1 |

FIG.9

| TYPE \ SPEED | < | – | 200Km/h | 60Km/h | 30Km/h |
| | ≧ | 200Km/h | 60Km/h | 30Km/h | – |
|---|---|---|---|---|---|
| HUMAN | | 0 | 0 | 0 | 1 |
| VEHICLE (THREE OR MORE WHEELED) | | 0 | 1 | 1 | 1 |
| MOTORCYCLE | | 0 | 1 | 1 | 1 |
| BICYCLE | | 0 | 0 | 1 | 1 |
| OTHER OBJECT | | 0 | 1 | 1 | 1 |

FIG.10

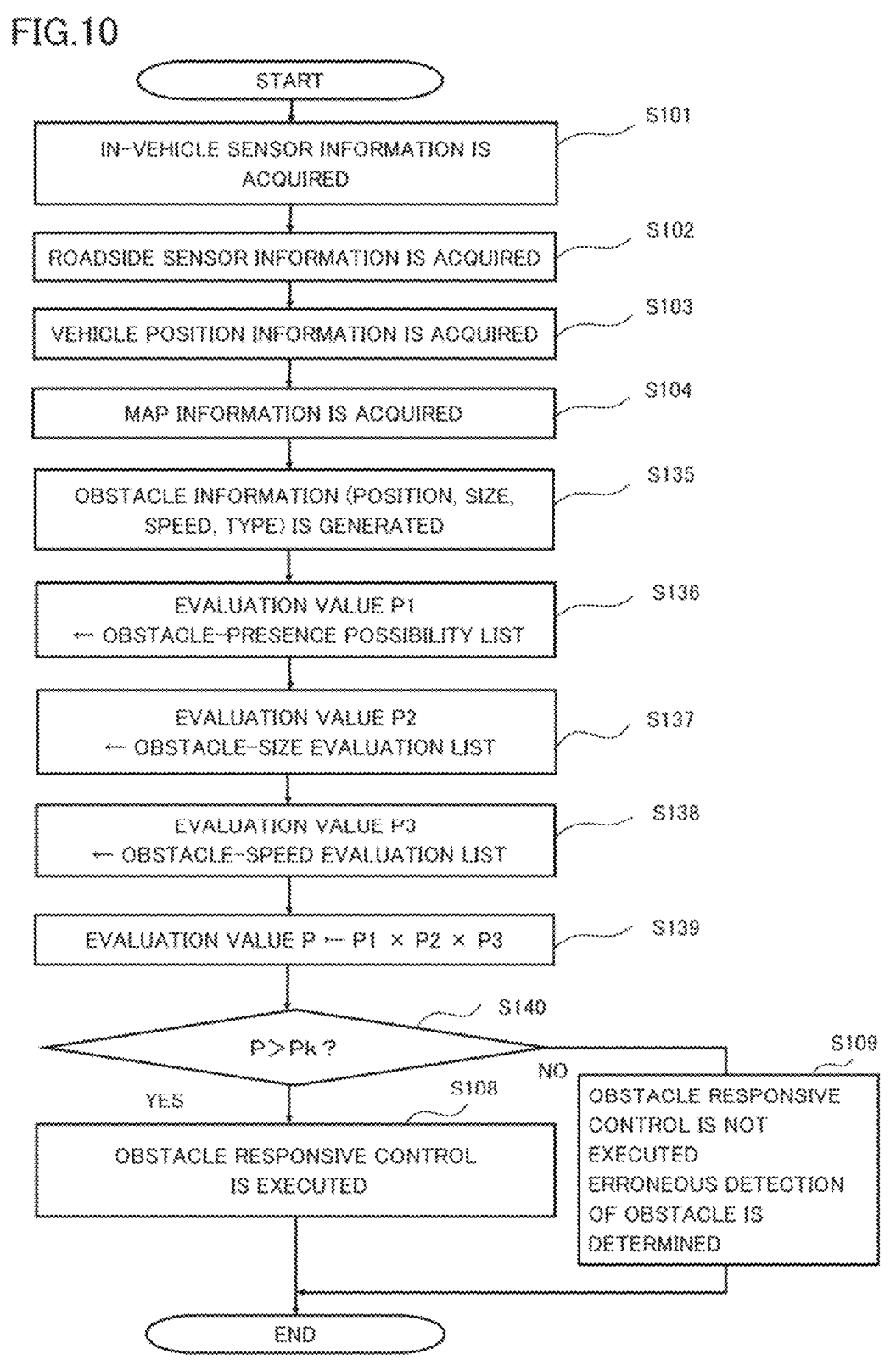

```
                    ┌─────────────┐
                    │    START    │
                    └──────┬──────┘
                           │
        ┌──────────────────────────────────────┐
        │   IN-VEHICLE SENSOR INFORMATION IS    │────  S101
        │              ACQUIRED                 │
        └──────────────────┬───────────────────┘
                           │
        ┌──────────────────────────────────────┐
        │  ROADSIDE SENSOR INFORMATION IS ACQUIRED │──  S102
        └──────────────────┬───────────────────┘
                           │
        ┌──────────────────────────────────────┐
        │  VEHICLE POSITION INFORMATION IS ACQUIRED │── S103
        └──────────────────┬───────────────────┘
                           │
        ┌──────────────────────────────────────┐
        │       MAP INFORMATION IS ACQUIRED     │────  S104
        └──────────────────┬───────────────────┘
                           │
        ┌──────────────────────────────────────┐
        │  OBSTACLE INFORMATION (POSITION, SIZE,│────  S135
        │     SPEED, TYPE) IS GENERATED         │
        └──────────────────┬───────────────────┘
                           │
        ┌──────────────────────────────────────┐
        │        EVALUATION VALUE P1            │────  S136
        │  ← OBSTACLE-PRESENCE POSSIBILITY LIST │
        └──────────────────┬───────────────────┘
                           │
        ┌──────────────────────────────────────┐
        │        EVALUATION VALUE P2            │────  S137
        │   ← OBSTACLE-SIZE EVALUATION LIST     │
        └──────────────────┬───────────────────┘
                           │
        ┌──────────────────────────────────────┐
        │        EVALUATION VALUE P3            │────  S138
        │   ← OBSTACLE-SPEED EVALUATION LIST    │
        └──────────────────┬───────────────────┘
                           │
        ┌──────────────────────────────────────┐
        │  EVALUATION VALUE P ← P1 × P2 × P3    │────  S139
        └──────────────────┬───────────────────┘
                           │
                      ◇ P > Pk ? ◇ ──── S140
```

$P > Pk$ ?

EVALUATION VALUE $P \leftarrow P1 \times P2 \times P3$

YES / NO

S108 — OBSTACLE RESPONSIVE CONTROL IS EXECUTED

S109 — OBSTACLE RESPONSIVE CONTROL IS NOT EXECUTED ERRONEOUS DETECTION OF OBSTACLE IS DETERMINED

END

FIG.11

| TYPE\REGION | GETTING ON/OFF AREA | SIDEWALK | BUS BAY | REFUGE BAY | ORDINARY ROAD | FREEWAY |
|---|---|---|---|---|---|---|
| HUMAN | 1.0 | 1.0 | 0.5 | 0.8 | 0.8 | 0.1 |
| VEHICLE (THREE OR MORE WHEELED) | 0.0 | 0.2 | 1.0 | 0.8 | 1.0 | 1.0 |
| MOTORCYCLE | 0.0 | 0.5 | 0.5 | 0.8 | 1.0 | 1.0 |
| BICYCLE | 0.1 | 0.7 | 0.5 | 0.8 | 1.0 | 0.1 |
| OTHER OBJECT | 1.0 | 1.0 | 1.0 | 1.0 | 1.0 | 1.0 |

FIG. 12

| TYPE\TOTAL LENGTH < | — | 20m | 10m | 2.5m | 1.0m | 0.5m | 0.3m |
| ≧ | 20m | 10m | 2.5m | 1.0m | 0.5m | 0.3m | — |
|---|---|---|---|---|---|---|---|
| HUMAN | 0.0 | 0.0 | 0.0 | 1.0 | 1.0 | 1.0 | 0.0 |
| VEHICLE (THREE OR MORE WHEELED) | 0.0 | 0.5 | 1.0 | 1.0 | 0.0 | 0.0 | 0.0 |
| MOTORCYCLE | 0.0 | 0.0 | 0.0 | 1.0 | 0.0 | 0.0 | 0.0 |
| BICYCLE | 0.0 | 0.0 | 0.0 | 1.0 | 0.0 | 0.0 | 0.0 |
| OTHER OBJECT | 1.0 | 1.0 | 1.0 | 1.0 | 1.0 | 1.0 | 1.0 |

FIG.13

| TYPE\SPEED | < | — | 200Km/h | 60Km/h | 30Km/h |
| --- | --- | --- | --- | --- | --- |
| | ≧ | 200Km/h | 60Km/h | 30Km/h | — |
| HUMAN | | 0.0 | 0.0 | 0.0 | 1.0 |
| VEHICLE (THREE OR MORE WHEELED) | | 0.0 | 1.0 | 1.0 | 1.0 |
| MOTORCYCLE | | 0.0 | 1.0 | 1.0 | 1.0 |
| BICYCLE | | 0.0 | 0.0 | 0.7 | 1.0 |
| OTHER OBJECT | | 0.0 | 1.0 | 1.0 | 1.0 |

FIG.14

REGION: GETTING ON/OFF AREA

| TYPE\SPEED | < | — | 30Km/h |
| --- | --- | --- | --- |
| | ≧ | 30Km/h | — |
| HUMAN | | 0.0 | 1.0 |
| VEHICLE (THREE OR MORE WHEELED) | | 0.0 | 0.0 |
| MOTORCYCLE | | 0.0 | 0.0 |
| BICYCLE | | 0.0 | 0.1 |
| OTHER OBJECT | | 0.0 | 1.0 |

FIG.15

REGION: SIDEWALK

| TYPE\SPEED | < ≧ 30Km/h | - 30Km/h | 30Km/h - |
|---|---|---|---|
| HUMAN | | 0.0 | 1.0 |
| VEHICLE (THREE OR MORE WHEELED) | | 0.1 | 0.2 |
| MOTORCYCLE | | 0.1 | 0.5 |
| BICYCLE | | 0.1 | 0.7 |
| OTHER OBJECT | | 0.0 | 1.0 |

FIG.16

REGION: BUS BAY

| TYPE\SPEED | < ≧ 30Km/h | - 30Km/h | 30Km/h - |
|---|---|---|---|
| HUMAN | | 0.0 | 0.5 |
| VEHICLE (THREE OR MORE WHEELED) | | 0.0 | 1.0 |
| MOTORCYCLE | | 0.0 | 0.5 |
| BICYCLE | | 0.0 | 0.5 |
| OTHER OBJECT | | 0.0 | 1.0 |

FIG.17

REGION: REFUGE BAY

| TYPE \ SPEED | < | – | 30Km/h |
| | ≧ | 30Km/h | – |
|---|---|---|---|
| HUMAN | | 0.0 | 0.8 |
| VEHICLE (THREE OR MORE WHEELED) | | 0.1 | 0.8 |
| MOTORCYCLE | | 0.1 | 0.8 |
| BICYCLE | | 0.1 | 0.8 |
| OTHER OBJECT | | 0.0 | 1.0 |

FIG.18

REGION: ORDINARY ROAD

| TYPE \ SPEED | < | – | 200Km/h | 60Km/h | 30Km/h |
| | ≧ | 200Km/h | 60Km/h | 30Km/h | – |
|---|---|---|---|---|---|
| HUMAN | | 0.0 | 0.0 | 0.0 | 1.0 |
| VEHICLE (THREE OR MORE WHEELED) | | 0.0 | 1.0 | 1.0 | 1.0 |
| MOTORCYCLE | | 0.0 | 1.0 | 1.0 | 1.0 |
| BICYCLE | | 0.0 | 0.0 | 0.7 | 1.0 |
| OTHER OBJECT | | 0.0 | 1.0 | 1.0 | 1.0 |

REGION: FREEWAY

| TYPE＼SPEED | <br>≧ | −<br>200Km/h | 200Km/h<br>60Km/h | 60Km/h<br>30Km/h | 30Km/h<br>− |
|---|---|---|---|---|---|
| HUMAN | | 0.0 | 0.0 | 0.0 | 0.2 |
| VEHICLE (THREE OR MORE WHEELED) | | 0.1 | 1.0 | 1.0 | 1.0 |
| MOTORCYCLE | | 0.0 | 1.0 | 1.0 | 1.0 |
| BICYCLE | | 0.0 | 0.0 | 0.2 | 0.2 |
| OTHER OBJECT | | 0.0 | 1.0 | 1.0 | 1.0 |

NORMAL SPEED    LIMITED SPEED

FIG.22

| NUMBER OF EXECUTION TIMES OF OBSTACLE RESPONSIVE CONTROL | LIMITED SPEED |
|---|---|
| 0 | 100% |
| 1 | 90% |
| 2 | 80% |
| 3 | 70% |

FIG.24

| NUMBER OF OBSTACLE DETECTION TIMES | LIMITED SPEED |
|---|---|
| 0 | 100% |
| 1 | 90% |
| 2 | 80% |
| 3 | 70% |

FIG.26

| NUMBER OF EXECUTION TIMES OF OBSTACLE RESPONSIVE CONTROL FOR A MONTH | LIMITED SPEED |
|---|---|
| 0 | 100% |
| 1 | 90% |
| 2 | 80% |
| 3 | 70% |

FIG.28

| NUMBER OF OBSTACLE DETECTION TIMES FOR A MONTH | LIMITED SPEED |
|---|---|
| 0 | 100% |
| 1 | 90% |
| 2 | 80% |
| 3 | 70% |

VEHICLE CONTROL DEVICE

TECHNICAL FIELD

The present disclosure relates to a vehicle control device.

BACKGROUND

Recently, it is desired to introduce automated driving technology to transport vehicles. Under efforts to deal with automated driving technology, such techniques related to collision damage reduction braking (Autonomous Emergency Braking (AEB)) in which an obstacle located on the front side, rear side or lateral side of a vehicle is detected to thereby bring the vehicle to an emergency stop, have been developed and employed in the market. These techniques can be used without limitation in traveling area of the vehicle, and avoid collision with the obstacle on the traveling route.

With respect to obstacle detection, cases may be assumed where, even though there is no obstacle, the presence of an obstacle is erroneously recognized. In such cases, obstacle responsive control will be unnecessarily executed and thus, an action such as selecting an avoidance route, reducing the speed, stopping the vehicle, or the like will be taken. Even though there is no obstacle in the traveling direction, the AEB function is activated, resulting in unnatural behavior of the vehicle. In particular, an environmental change due to weather such as rain, cloud, fog or the like, an environmental change between daytime and night time, and a road environmental change due to tunnel or the like, have large impacts on the obstacle detection. This results in large disturbance to the obstacle detection, so that all of the detection errors could not be eliminated.

As a way to increase the reliability of the obstacle detection, such a technique is disclosed in which, for each of small regions set around the vehicle, a provability value indicating likelihood of presence of an obstacle is calculated and stored, and then these provability values are updated. This makes it possible to cover sensor blind spots, erroneous detection or oversight of detection caused by a change in direction or distance to an obstacle that may occur due to vehicle movement (for example, Patent Document 1).

CITATION LIST

Patent Document

Patent Document 1: Japanese Patent No. 3147541

According to the technique disclosed in Patent Document 1, the reliability of the obstacle detection may be increased in such a manner that the provability value indicating likelihood of presence of an obstacle is calculated and updated for each of the small regions around the vehicle. However, how reliable is the detection result is not evaluated according to a type of the obstacle. A possibility that the detected obstacle is actually present, is not evaluated focusing on whether the type of the obstacle is a vehicle (having three or more wheels), a motorcycle (two-wheeled motor vehicle), a bicycle (two-wheeled vehicle), a human or another obstructive object.

When whether the obstacle is actually present or not is evaluated focusing on the type of the obstacle, it is possible to further increase the reliability of the obstacle detection result. This makes it possible to suppress the occurrence of cases where, even though there is no obstacle, the AEB function is activated, resulting in unnatural behavior of the vehicle.

SUMMARY

The present disclosure has been made to solve the problem as described above. An object thereof is to provide a vehicle control device which can adequately perform obstacle responsive control by increasing the reliability of the obstacle detection result in such a manner that whether the obstacle is actually present or not is evaluated focusing on the type of the obstacle.

Solution to Problem

A vehicle control device according to this disclosure comprises:

an in-vehicle sensor information acquisition unit that acquires information from an in-vehicle sensor that is provided in a vehicle to detect an obstacle around the vehicle;

a roadside sensor information acquisition unit that acquires information from a roadside sensor that is placed on a roadside to detect an obstacle therearound;

a vehicle position information acquisition unit that acquires position information of the vehicle;

a map information acquisition unit that acquires map information around the vehicle on a basis of the position information of the vehicle acquired by the vehicle position information acquisition unit;

an obstacle information generation unit that generates obstacle information including information of at least one of a position, a size and a speed of the obstacle and information of a type of the obstacle, on a basis of in-vehicle sensor information as the information acquired by the in-vehicle sensor information acquisition unit, roadside sensor information as the information acquired by the roadside-sensor information acquisition unit, and vehicle position information as the information acquired by the vehicle position information acquisition unit; and an obstacle responsive control unit that determines whether or not to execute obstacle responsive control, on a basis of the obstacle information generated by the obstacle information generation unit and at least one obstacle-presence possibility list in which obstacle presence possibilities are assigned to respective types of obstacles, and then, when determined to execute obstacle responsive control, controls the vehicle in response to the obstacle.

Advantageous Effects

With the vehicle control device according to this disclosure, whether the obstacle is actually present or not is evaluated focusing on the type of the obstacle, so that the reliability of the obstacle detection result is increased. This makes it possible to provide a vehicle control device which can adequately perform obstacle responsive control.

BRIEF DESCRIPTION OF DRAWINGS

FIG. 5 is a table showing a list of obstacle presence possibilities for respective regions and respective types of obstacles, according to Embodiment 1.

FIG. 7 is a table showing an obstacle-size evaluation list according to Embodiment 2.

FIG. 9 is a table showing an obstacle-speed evaluation list according to Embodiment 3.

FIG. 10 is a flowchart showing processing of a vehicle control device according to Embodiment 4.

FIG. 11 is a table showing a list of obstacle presence possibilities for respective regions and respective types of obstacles, according to Embodiment 4.

FIG. 12 is a table showing an obstacle-size evaluation list according to Embodiment 4.

FIG. 13 is a table showing an obstacle-speed evaluation list according to Embodiment 4.

FIG. 14 is a table showing an obstacle-speed evaluation list for a getting-on/off area, according to Embodiment 4.

FIG. 15 is a table showing an obstacle-speed evaluation list for a sidewalk, according to Embodiment 4.

FIG. 16 is a table showing an obstacle-speed evaluation list for a bus bay, according to Embodiment 4.

FIG. 17 is a table showing an obstacle-speed evaluation list for a refuge bay, according to Embodiment 4.

FIG. 18 is a table showing an obstacle-speed evaluation list for an ordinary road, according to Embodiment 4.

FIG. 22 is a table showing a relationship between a number of execution times of obstacle responsive control and a speed limit value, according to Embodiment 5.

FIG. 24 is a table showing a relationship between a number of obstacle detection times and a speed limit value, according to Embodiment 6.

FIG. 26 is a table showing a relationship between a number of execution times of obstacle responsive control for a month and a speed limit value, according to Embodiment 7.

FIG. 28 is a table showing a relationship between a number of obstacle detection times for a month and a speed limit value, according to Embodiment 8.

DESCRIPTION OF EMBODIMENTS

Figure 1:
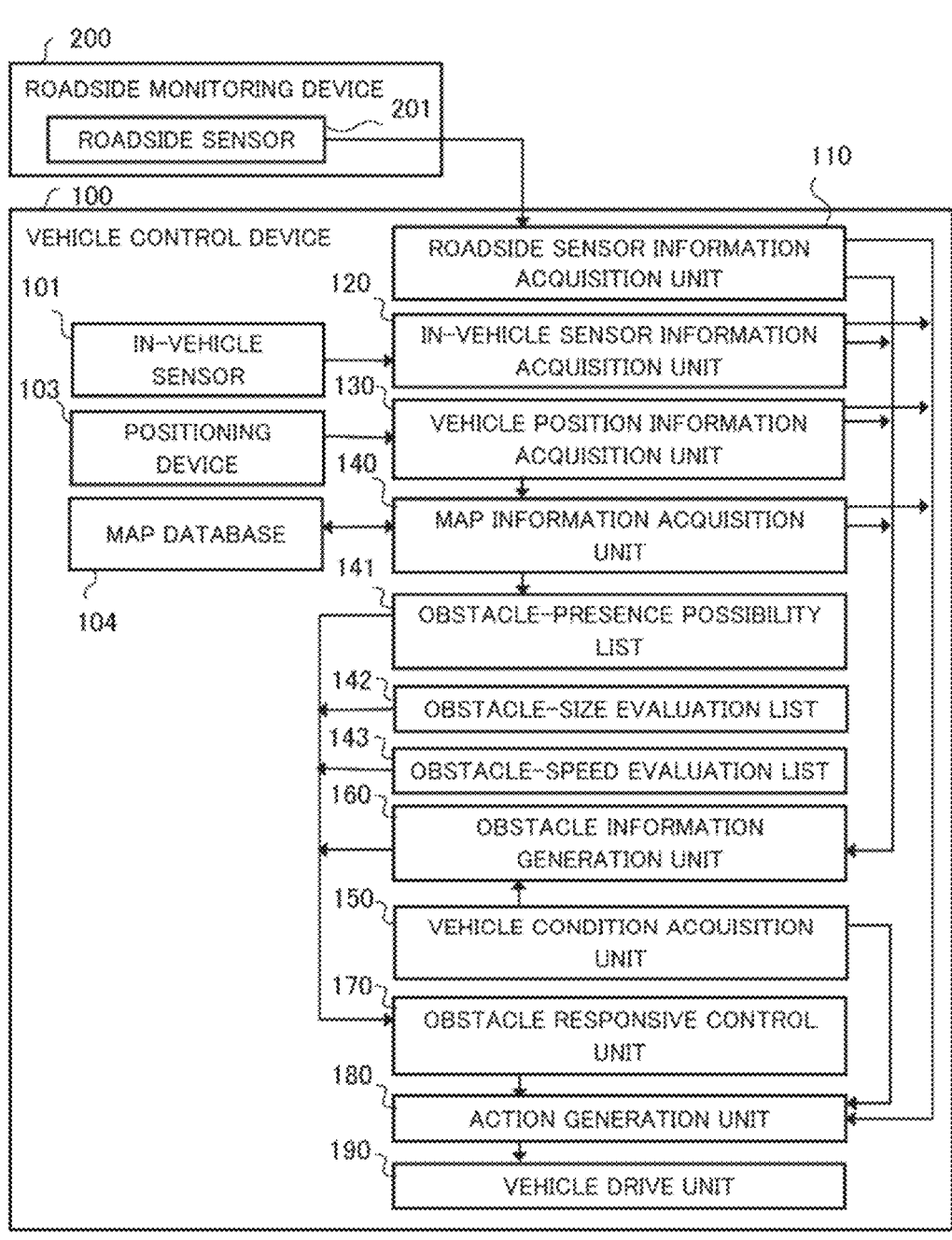
FIG. 1 is a configuration diagram of a vehicle control device according to Embodiment 1.

Society of Automotive Engineers (SAE) defines technical levels of driving automation for ordinary vehicles traveling on public roads. Many manufacturers and social organizations employ these technical levels. At Level 4 driving automation, conditions for continuing automatic travel of a vehicle without the need of constant monitoring of the vehicle by the driver, are determined.

According to "Safety Technical Guidelines for Self-Driving Vehicles" set by Ministry of Land, Infrastructure, Transport and Tourism (Japan), the Level 4 driving automation is obligated to have the function of Minimum Risk Maneuver (MRM). The function of MRM is a function of automatically causing a vehicle to stop safely when an automated driving system determines that automated driving is difficult to continue, for example, in the case where the vehicle gets out of Operation Design Domain (ODD), a failure occurs in the automated driving vehicle, or the like.

In the technology for automated driving vehicles, such techniques related to collision damage reduction braking (ABE) in which an obstacle located on the front side, rear side or lateral side of the vehicle is detected to thereby bring the vehicle to an emergency stop, have been developed. Here, a vehicle control device for increasing the reliability of the obstacle detection to thereby adequately execute obstacle responsive control is disclosed.

Hereinafter, embodiments thereof will be described in detail with reference to figures. It should be noted that the figures are schematic/summarized illustrations in which omissions and simplifications are made as appropriate in the configuration elements for convenience' sake of explanation. Further, a mutual relationship in size and in position between respective configuration elements shown in each of the different figures is not necessarily illustrated precisely, and may be changed as appropriate. Further, in the following description, the same reference numerals will be used for equivalent configuration elements as indicated in the figures, and the names and the functions of these elements are assumed to be the same. Accordingly, detailed description may be omitted for such an element in order to avoid duplicated description thereof.

1. Embodiment 1

<Configuration of Vehicle Control Device>

In FIG. 1, an exemplary configuration of a vehicle control device 100 according to Embodiment 1 that is mounted on a vehicle 1 is shown. In the vehicle control device 100, obstacle information is generated by an obstacle information generation unit 160 on the basis of information, such as, information of various sensors, vehicle position information, map information, etc. Then, whether obstacle responsive control is necessary or not is determined by an obstacle responsive control unit 170 and, when it is necessary, the obstacle responsive control is executed. An action plan of the vehicle is generated by an action generation unit 180, and the vehicle is driven by a vehicle drive unit 190.

<In-Vehicle Sensor>

The vehicle control device 100 includes an in-vehicle sensor 101 that detects an obstacle around the vehicle 1. The in-vehicle sensor 101 is at least one sensor that recognizes an external environment, and may be constituted by a combination of an image sensor, a radio sensor, an optical sensor, an ultrasonic sensor, and the like. As the obstacle to be detected, a three or more-wheeled vehicle, a motorcycle, a bicycle, a pedestrian, another obstructive object, or the like, may be assumed.

As represented by a monitoring camera, the image sensor images an object and then calculates from the image data captured within a specified viewing angle, a distance to that object. From the image data, a size, a moving direction, a moving speed, a type or the like, of the object may be acquired. As the image sensor, a visible light camera, an infrared camera or the like may be used.

As the radio sensor, a millimeter wave radiometer radar (MMWR) that uses a frequency range of 24 to 79 GHz, or the like may be used. By the radio sensor, it is possible to detect the position of an object and also to detect, using a Doppler effect, the moving speed of the object.

As the optical sensor, a laser radar, a LiDAR (Light Detection and Ranging) or the like may be used. It is possible to recognize the position and the shape of an object by radiating laser light within a fixed viewing field to thereby detect point-group data obtained due to reflection of the laser light on the object.

An in-vehicle sensor information acquisition unit 120 receives information of the image sensor, the radio sensor, the optical sensor and the ultrasonic sensor as sensors for recognizing the external environment. The in-vehicle sensor information acquisition unit 120 may use all of the image sensor, the radio sensor, the optical sensor and the ultrasonic sensor as described above; however, it may use only one or some of these sensors. Further, another sensor may be used in order to recognize the external environment.

The in-vehicle sensor information acquisition unit 120 may employ a sensor fusion technique in which an object is detected using these pieces of information in combination. By combining such plural types of sensor information, it becomes possible to remove noise information to thereby perform ranging, speed detection and attributive identification of an object, highly reliably. Further, an obstacle may be identified on the basis of a reinforcement learning such as deep learning.

Such pieces of information may be all processed by the in-vehicle sensor information acquisition unit 120; however, it is allowed that information processing is executed in each of these sensors, namely, the data acquired by such various sensors is processed there, and then, only information of a position, an outer shape, a speed and a type about the identified object, is transferred to the in-vehicle sensor information acquisition unit 120. This makes it possible to execute processing of the sensor information in a distributed manner, so that an amount of information to be processed solely by the in-vehicle sensor information acquisition unit 120 can be reduced. The in-vehicle sensor information acquisition unit 120 transfers information related to the obstacle to the obstacle information generation unit 160 and the action generation unit 180.

<Roadside Monitoring Device and Roadside Sensor>

A roadside monitoring device 200 may also be referred to as an RSU (Road-Side Unit). On the roadside, multiple roadside monitoring devices 200 are placed, each including a roadside sensor 201 that detects an obstacle therearound. The multiple roadside monitoring devices 200 may be located collectively at the same place so as to perform monitoring in all directions around them in a shared manner. Instead, the multiple roadside monitoring devices 200 may be located apart from each other so as to monitor a road, an intersection, etc. from different directions. In terms of cost, etc., it is impractical to detect the obstacles on all of the roads, so that, in many cases, the roadside monitoring devices 200 are placed, in particular, at an intersection/corner where many accidents have occurred, a road with poor visibility, and the like.

Using the roadside sensor 201, the roadside monitoring device 200 recognizes an external environment within a specified viewing angle, to thereby detect an obstacle around an intersection or a road. As the sensor that recognizes the external environment, like the in-vehicle sensor 101, an image sensor, a radio sensor, an optical sensor, an ultrasonic sensor and the like may be included. As the obstacle to be detected, like the case of the in-vehicle sensor 101, a three or more-wheeled vehicle, a motorcycle, a bicycle, a pedestrian, another obstructive object, or the like, may be assumed.

Further, although the roadside monitoring device 200 may use all of the image sensor, the radio sensor, the optical sensor and the ultrasonic sensor as described above, it may use only one or some of these sensors. Further, another sensor may be used in order to recognize the external environment.

A roadside sensor information acquisition unit 110 in the vehicle control device 100 receives information of the roadside sensor 201 in the roadside monitoring device 200. The transaction of information between the roadside monitoring device 200 and the vehicle control device 100 may be established through a communication unit provided in the roadside monitoring device 200 and a communication unit provided in the vehicle control device 100 (illustration of these communication units is omitted in FIG. 1).

The roadside sensor information acquisition unit 110 may employ a sensor fusion technique in which an object is detected using pieces of information of these sensors in combination. Such pieces of sensor information may be all processed by the roadside sensor information acquisition unit 110; however, it is allowed that information processing is executed in each of these sensors, namely, the data acquired by such various sensors is processed there, and then, only information of a position, an outer shape, a speed and a type about the identified object, is transferred to the roadside sensor information acquisition unit 110. This makes it possible to execute processing of the sensor information in a distributed manner, so that an amount of information to be processed solely by the roadside sensor information acquisition unit 110 can be reduced.

<Vehicle Position Information and Map Information>

The vehicle control device 100 includes a positioning device 103 that detects the position information of the vehicle 1. The positioning device 103 can calculate the position of the host vehicle by using: positioning information from a GNSS (Global Navigation Satellite System) that detects the host vehicle position; a travel distance sensor that detects the wheel rotation number of the vehicle 1; a gyro sensor that detects the acceleration, the speed, the angular acceleration and the angular speed of the vehicle 1; and the like. Further, the host vehicle position may be specified by use of a short-range wireless communication technology, such as an NFC (Near Field Communication) technology that use information of embedded tags or the like on the roadside. Furthermore, the host vehicle position may be determined in such a manner that a building and a sign acting as landmarks are identified by the in-vehicle sensor.

The vehicle position information detected by the positioning device 103 is transferred to a vehicle position information acquisition unit 130. Then, the vehicle position information is transferred from the vehicle position information acquisition unit 130 to a map information acquisition unit 140, the obstacle information generation unit 160 and the action generation unit 180.

On the basis of the vehicle position information, the map information acquisition unit 140 acquires map information around the current traveling position from a map database 104. Although the map database 104 may be installed in the vehicle 1, it may be formed of data stored in a server outside the vehicle. Further, the map information may be a dynamic map dynamically created/updated in the vehicle.

The map information acquisition unit 140 transfers to the obstacle information generation unit 160 and the action generation unit 180, information necessary therefor. Further, the map information acquisition unit 140 reads out from the map database 104, an obstacle-presence possibility list 141 in which, for each of regions, obstacle presence possibilities are assigned to the respective types of obstacles, and then, puts the list to use for evaluation in the obstacle responsive control unit 170.

<Obstacle Information Generation Unit>

The obstacle information generation unit 160 generates information about the type, the position, the size and the speed of the detected obstacle, on the basis of the in-vehicle sensor information, the roadside sensor information and the vehicle position information. For example, the obstacle type is represented by one of a three or more-wheeled vehicle, a motorcycle, a bicycle, a pedestrian and another obstructive object. With respect to the position of the obstacle, it is possible to obtain absolute position information of the obstacle from the roadside sensor 201. Further, it is possible to obtain, from the in-vehicle sensor 101, position information of the obstacle relative to the vehicle 1, to thereby calculate the absolute position of the obstacle by using the vehicle position information.

<Obstacle Responsive Control Unit>

The obstacle responsive control unit 170 evaluates whether the detected obstacle is actually present or not, on the basis of: the information about the type, the position, the size and the speed of the obstacle that is provided by the obstacle information generation unit 160; the obstacle-presence possibility list 141; an obstacle-size evaluation list 142; and an obstacle-speed evaluation list 143. When evaluated that the obstacle is present, the obstacle responsive control unit determines to execute obstacle responsive control. When evaluated that the obstacle is not actually present, the obstacle responsive control unit does not execute obstacle responsive control and determines that the obstacle has been detected erroneously.

Examples of the obstacle responsive control include stopping the vehicle 1, reducing the speed, selecting a route for avoiding the obstacle, performing action of overtaking the obstacle, and the like. How the vehicle should act in response to the obstacle is determined, for example, when a pedestrian jumps in front of the vehicle 1, emergency stop control is determined to be taken, when another vehicle at a slow speed is present ahead, following traveling control is determined to be taken, and when another vehicle is stopped ahead, overtaking control is determined to be taken.

The action generation unit 180 makes a plan of action (speed increase, speed reduction, stoppage, route change) of the vehicle, to thereby control the behavior of the vehicle. Specifically, driving of wheels, steering operation, braking, gear-shifter operation, etc., are executed by the vehicle drive unit 190.

A vehicle condition acquisition unit 150 acquires information of the speed, tire angle, engine (or motor) rotation speed of the vehicle 1, the cooling water temperature, the outside air temperature, and the like. It may additionally acquire information of the wheel base length, the identification number, or the like.

<Hardware Configuration of Control Device>

Figure 2:
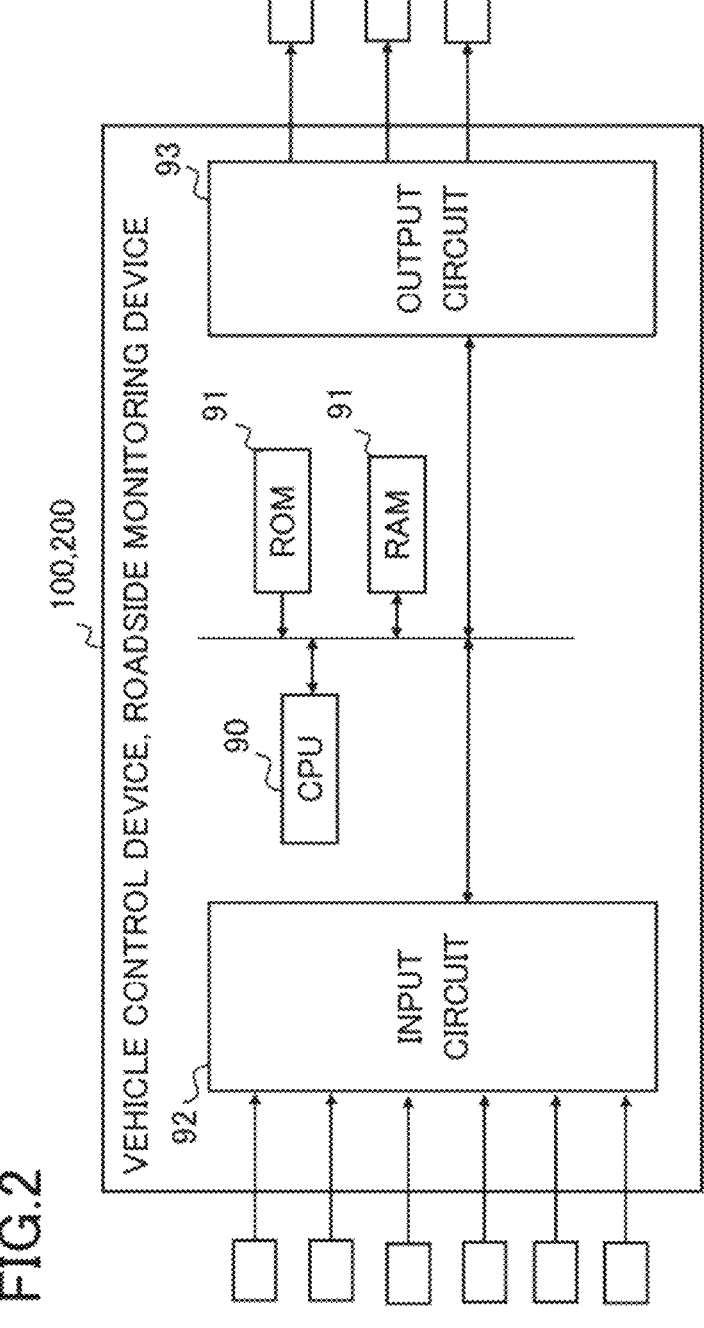
FIG. 2 is a hardware configuration diagram of the vehicle control device according to Embodiment 1.

FIG. 2 is a hardware configuration diagram of a vehicle control device. The hardware configuration diagram shown in FIG. 2 may be applied not only to the vehicle control device 100 but also to the roadside monitoring device 200 in an individual manner. Here, description will be made about a case where it is applied to the vehicle control device 100 as a representative. In this Embodiment, the vehicle control device 100 is an electronic control device which is installed in the vehicle 1 in order to cause the vehicle 1 to execute obstacle responsive control. The respective functions of the vehicle control device 100 are implemented by a processing circuit included in the vehicle control device 100. Specifically, the vehicle control device 100 includes as the processing circuit: an arithmetic processing device 90 (computer) such as a CPU (Central Processing Unit) or the like; storage devices 91 that perform data transactions with the arithmetic processing device 90; an input circuit 92 that inputs external signals to the arithmetic processing device 90; an output circuit 93 that externally outputs signals from the arithmetic processing device 90; and the like. The respective pieces of hardware, such as the arithmetic processing device 90, the storage devices 91, the input circuit 92, the output circuit 93, etc. are connected to each other by way of a wired network such as a bus line, or a wireless network.

As the arithmetic processing device 90, there may be included an ASIC (Application Specific Integrated Circuit), an IC (Integrated Circuit), a DSP (Digital Signal Processor), a GPU (Graphics Processing Unit), an FPGA (Field Programmable Gate Array), any one of a variety of logic circuits, any one of a variety of signal processing circuits, or the like. Further, multiple arithmetic processing devices 90 of the same type or different types may be included so that the respective parts of processing are executed in a shared manner. As the storage devices 91, there are included a RAM (Random Access Memory) that is configured to allow reading and writing of data by the arithmetic processing device 90, a ROM (Read Only Memory) that is configured to allow reading of data by the arithmetic processing device 90, and the like. As the storage device 91, a non-volatile or volatile semiconductor memory, such as a flash memory, an SSD (Solid State Drive), an EPROM, an EEPROM or the like; a magnetic disc; a flexible disc; an optical disc; a compact disc; a mini disc; a DVD; or the like, may be used. The input circuit 92 includes A-D converters, a communication circuit, etc. to which a variety of sensors and switches and a communication line, are connected, and which serve to input the output signals of the sensors and switches, and communication information, to the arithmetic processing device 90. The output circuit 93 includes a driver circuit, a communication circuit, etc. which serve to output control signals coming from the arithmetic processing device 90. The interfaces of the input circuit 92 and the output circuit 93 may be those based on the specification of CAN (Control Area Network) (Registered Trademark), Ethernet (Registered Trademark), USB (Universal Serial Bus) (Registered Trademark), DVI (Digital Visual Interface) (Registered Trademark), HDMI (High-Definition Multimedia Interface) (Registered Trademark) or the like. Further, independently of the input circuit 92 and the output circuit 93, it is allowed to establish communication by directly connecting the arithmetic processing device 90 to a communication device.

The respective functions that the vehicle control device 100 includes, are implemented in such a manner that the arithmetic processing device 90 executes software (programs) stored in the storage device 91 such as the ROM or the like, to thereby cooperate with the other hardware in the vehicle control device 100, such as the other storage device 91, the input circuit 92, the output circuit 93, etc. Note that the set data of threshold values, determination values, etc. to be used by the vehicle control device 100 is stored, as a part of the software (programs), in the storage device 91 such as the ROM or the like. Although each of the functions that the vehicle control device 100 has, may be established by a software module, it may be established by a combination of software and hardware.

<Obstacle-Presence Possibility List for Each Region>

Figure 3:
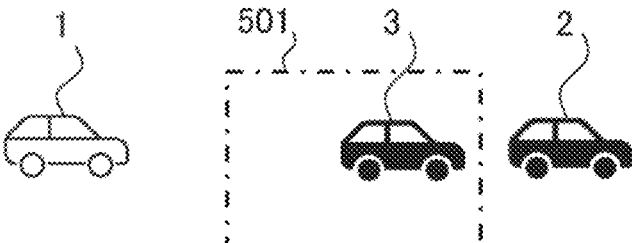
FIG. 3 is a diagram for illustrating an exemplary case where an obstacle is assumed to be erroneously detected by the vehicle control device according to Embodiment 1.

FIG. 3 is a diagram for illustrating an exemplary case where an obstacle is assumed to be erroneously detected by the vehicle control device 100 according to Embodiment 1. This figure shows a situation where, by the vehicle 1, another vehicle that is actually present at a position shown by a vehicle 2, is detected as if it were present at a position shown by a vehicle 3. Let's assume a case where a region 501 in which the vehicle 3 seems to be present is a getting on/off area of a bus or a streetcar and thus there is much less possibility that a vehicle is present therein. In that case, the vehicle 3 detected in the region 501 is ignored as it is not present, and thus obstacle responsive control is not executed. Further, it is determined that the obstacle has been detected erroneously.

<Processing of Vehicle Control Device>

Figure 4:
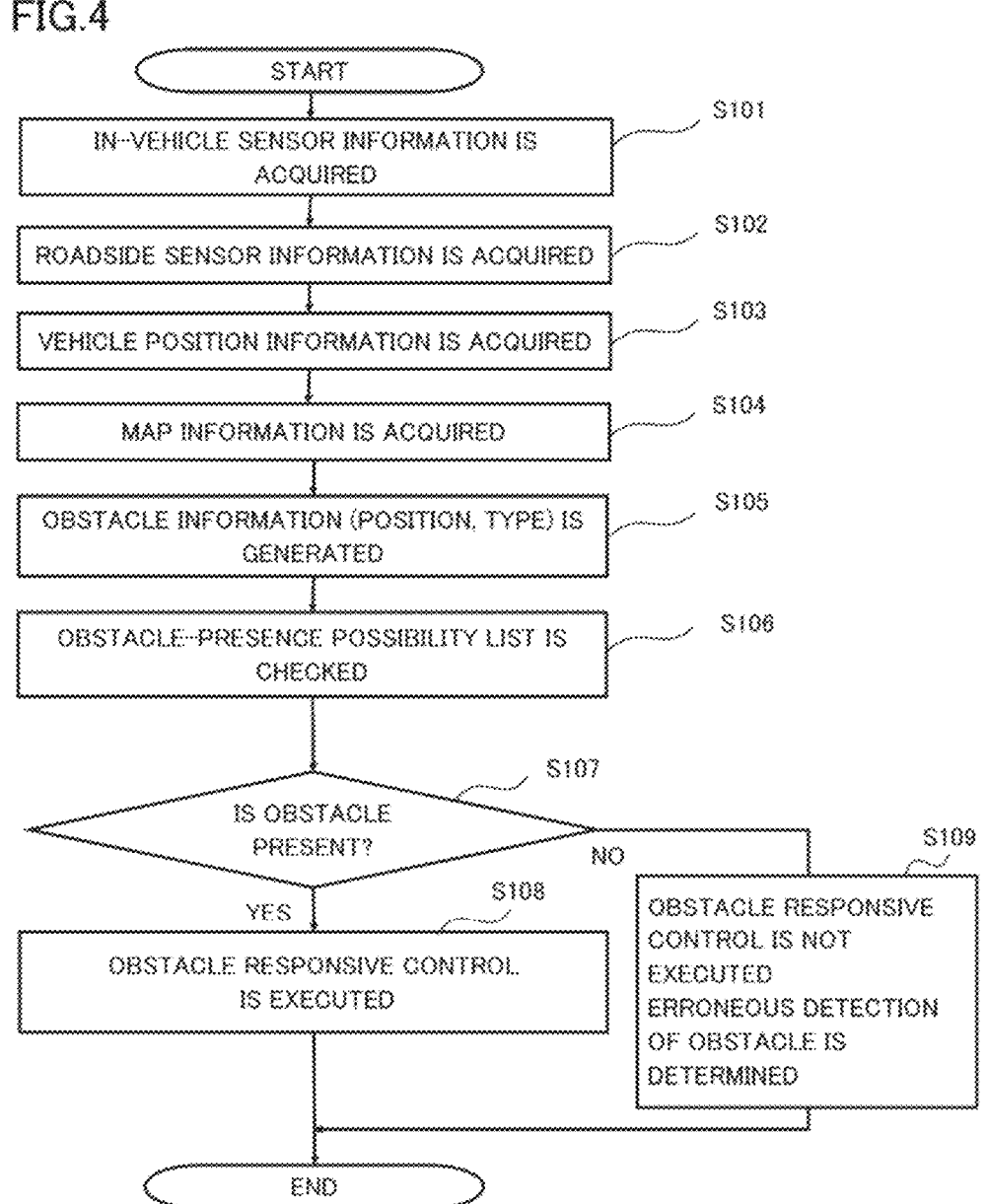
FIG. 4 is a flowchart showing processing of the vehicle control device according to Embodiment 1.

FIG. 4 is a flowchart showing processing of the vehicle control device 100 according to Embodiment 1. FIG. 5 is a table showing a list of obstacle presence possibilities for respective regions and respective types of obstacles, according to Embodiment 1. The processing shown in FIG. 4 is executed by the arithmetic processing device in the vehicle control device 100. The processing may be executed every fixed period of time (for example, every 1 ms). It is allowed that the processing is not executed every fixed period of time but executed in response to an event, for example, in response to the acquisition of the roadside sensor information by the roadside sensor information acquisition unit 110 of the vehicle control device 100, or the acquisition of the in-vehicle sensor information by the in-vehicle sensor information acquisition unit 120.

Upon starting the processing of FIG. 4, in Step S101, the in-vehicle sensor information acquisition unit 120 acquires the in-vehicle sensor information. Then, in Step S102, the roadside sensor information acquisition unit 110 acquires the roadside sensor information.

In Step S103, the vehicle position information acquisition unit 130 acquires the vehicle position information. Then, in Step S104, the map information acquisition unit 140 acquires the map information.

In Step S105, the obstacle information generation unit 160 generates obstacle information (its position and type). Here, the obstacle information generation unit 160 generates information about the type and the position of the detected obstacle on the basis of the in-vehicle sensor information, the roadside sensor information and the vehicle position information.

However, the type and the position of the obstacle may have been already described in the in-vehicle sensor information and/or the roadside sensor information after being processed. If this is the case, the obstacle information generation unit 160 transfers the received data without change to the obstacle responsive control unit 170. Further note that, in that case, "OBSTACLE INFORMATION IS GENERATED" stated in Step S105 in the flowchart of FIG. 4 shall be replaced with "OBSTACLE INFORMATION IS READ OUT".

In Step S106, the obstacle-presence possibility list 141 is checked. The obstacle-presence possibility list 141 to be referenced here, is "a first obstacle-presence possibility list" that is exemplified by FIG. 5 and in which obstacle presence possibilities for respective types of obstacles and for respective regions, are each indicated by a score of 1 or 0.

The scores of 1 and 0 listed in FIG. 5 are just an example and the listed scores shall be revised according to the situation. With respect to the types of obstacles, although the obstacles are classified into five types of a human, a three or more-wheeled vehicle, a motorcycle, a bicycle and another object, they may be classified into the number of types less than five, or may be classified into six or more types. A getting on/off area as one of the regions means a place that is one step higher than the road surface and that is formed for getting on/off a bus or a streetcar, provided that a waiting place provided for passengers who intend to get on a bus is included therein. With respect to the getting on/off area, there is less possibility that any type of vehicle enters there, so that the score 0 is listed for any type of vehicle.

With respect to a sidewalk as one of the regions, there is less possibility that a vehicle (having three or more wheels) or a motorcycle enters there, so that the score 0 is listed therefor. However, it is frequent that a bicycle enters there, so that the score 1 is listed therefor. A bus bay as one of the regions means a region corresponding to a part of a bus stop that is formed by cutting out of a sidewalk and where a bus is easy to stop. A road portion in a bus terminal shall be regarded as a bus bay since it is a place having a property equivalent to that of the bus bay. With respect to the section of the bus bay, there is a possibility that any type of vehicle enters there when a bus has not entered there, so that the score 1 is listed for any type of vehicle.

With respect to a refuge bay as one of the regions that is a space for allowing vehicles to pass each other in a narrow road, or a structure provided along a long steep slope, there is a possibility, like an ordinary road, that any type of vehicle or a human enters there, so that the score 1 is listed therefor. With respect to a freeway as one of the regions, there is less possibility that a human or bicycle enters there, so that the score 0 is listed for a human/bicycle.

In Step S106, data in the obstacle-presence possibility list corresponding to the obstacle type and corresponding to the region that includes the position of the obstacle represented by the obstacle information (its position and type), is referenced. If the data is the score 1, it is determined in Step S107 that the obstacle is present (judgement is YES), and the flow moves to Step S108. If it is the score 0, it is determined in Step S107 that the obstacle is not present (judgement is NO), and the flow moves to Step S109.

In Step S108, the obstacle responsive control unit 170 executes obstacle responsive control. Then, the processing is terminated.

In Step S109, the obstacle responsive control unit 170 does not execute obstacle responsive control, and determines that the obstacle has been detected erroneously. Then, the processing is terminated.

In this manner, it is possible to confirm whether or not the detected obstacle has been erroneously detected, by referencing the obstacle-presence possibility list in which obstacle presence possibilities are assigned to the respective obstacle presentable regions and the respective types of obstacles. This makes it possible to increase the reliability of the obstacle detection to thereby restrict the obstacle responsive control from being executed unnecessarily. Since inexplicable stop and inexplicable behavior of the vehicle 1 will be restricted accordingly, the ride comfort of the vehicle 1 is improved.

2. Embodiment 2

<Processing of Vehicle Control Device>

Figure 6:
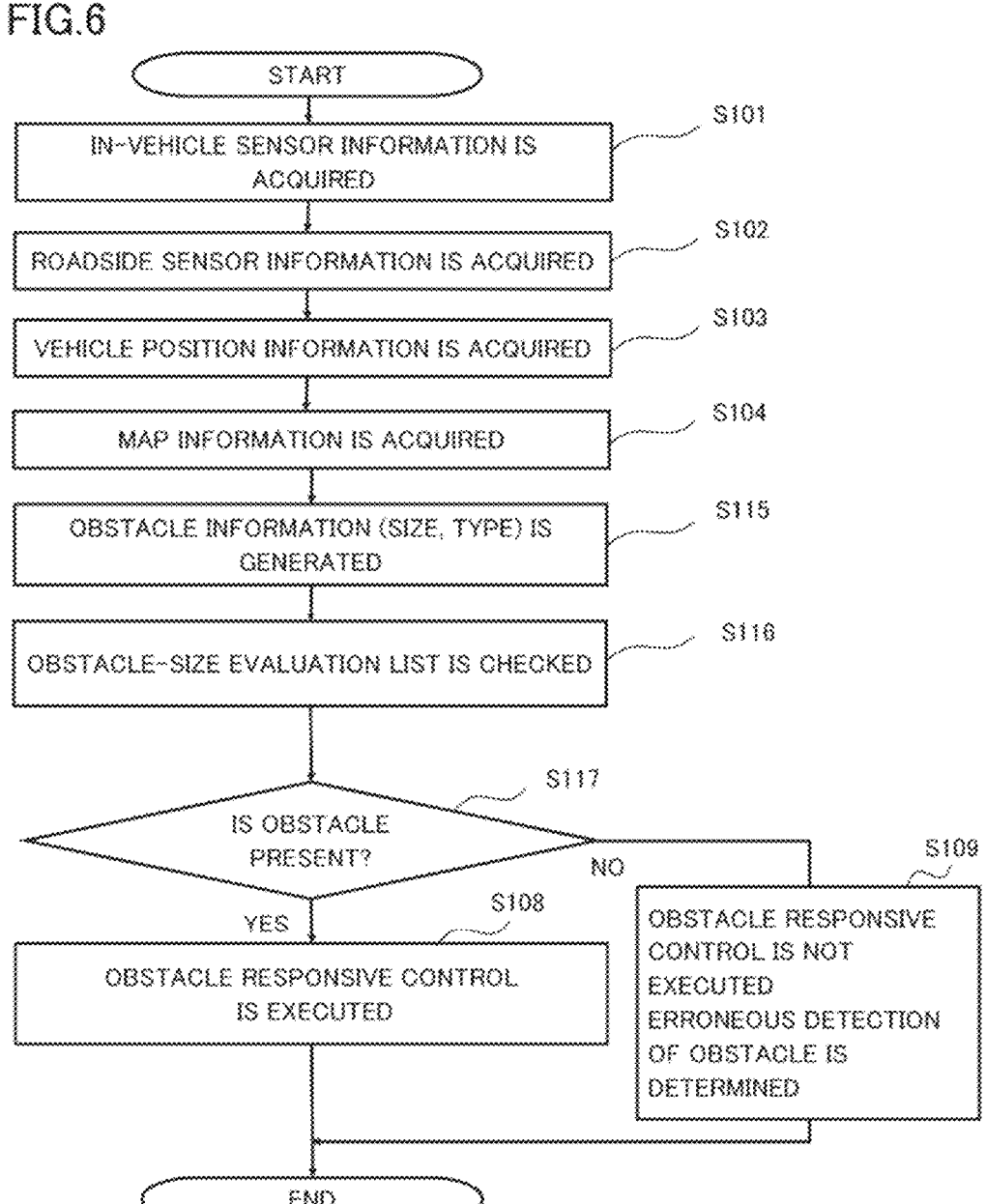
FIG. 6 is a flowchart showing processing of a vehicle control device according to Embodiment 2.

FIG. 6 is a flowchart showing processing of a vehicle control device 100 according to Embodiment 2. FIG. 7 is a table showing an obstacle-size evaluation list according to Embodiment 2.

The processing shown in FIG. 6 is executed by the arithmetic processing device in the vehicle control device 100. The processing may be executed every fixed period of time (for example, every 1 ms). It is allowed that the processing is not executed every fixed period of time but executed in response to an event, for example, in response to the acquisition of the roadside sensor information by the roadside sensor information acquisition unit 110 of the vehicle control device 100, or the acquisition of the in-vehicle sensor information by the in-vehicle sensor information acquisition unit 120.

In the processing of FIG. 6, Steps S101 to S104, Step S108 and Step S109 are the same as those in the flowchart of FIG. 4 according to Embodiment 1, so that description thereof will be omitted. What differs from the processing of FIG. 4 is Step S115 to Step S117, so that description will be made only on the differences.

In Step S115, the obstacle information generation unit 160 generates obstacle information (its size and type). Here, the obstacle information generation unit 160 generates information about the size and the type of the detected obstacle on the basis of the in-vehicle sensor information, the roadside sensor information and the vehicle position information.

However, the type and the size of the obstacle may have been already described in the in-vehicle sensor information and/or the roadside sensor information after being processed. If this is the case, the obstacle information generation unit 160 transfers the received data without change to the obstacle responsive control unit 170. Further note that, in that case, "OBSTACLE INFORMATION IS GENERATED" stated in Step S115 in the flowchart of FIG. 6 shall be replaced with "OBSTACLE INFORMATION IS READ OUT".

In Step S116, the obstacle-size evaluation list 142 is checked. The obstacle-size evaluation list to be referenced here is a list that is exemplified by FIG. 7 and in which obstacle presence possibilities for respective types of obstacles and for respective sizes of obstacles, are each indicated by 1 or 0. The obstacle-size evaluation list is also referred to as "a second obstacle-presence possibility list".

The scores of 1 and 0 listed in FIG. 7 are just an example and the listed scores shall be revised according to the situation. With respect to the types of obstacles, although the obstacles are classified into five types of a human, a three or more-wheeled vehicle, a motorcycle, a bicycle and another object, they may be classified into the number of types less than five, or may be classified into six or more types. The sizes (entire lengths) of obstacles are classified into ranges defined using 20 m, 10 m, 2.5 m, 1 m, 0.5 m and 0.3 m on a "no less than" or "less than" basis. The size ranges are not limited to this example.

With respect to the length of no less than 20 m, there is no human having such a length and it is much less frequent that any type of vehicle has such a length, so that the score 0 is listed therefor. With respect to the other length of no less than 10 m, a truck or bus may be expected but any type of two-wheeled vehicle or a human may not be expected, so that the score 1 and the score 0 are listed for them, respectively. With respect to the length of no less than 2.5 m, it is less frequent that a human or any type of two-wheeled vehicle has such a length, so that the score 0 is listed therefor. With respect to the length of from 1 m to less than 2.5 m, both a human and any type of vehicle may be expected, so that the score 1 is listed therefor. With respect to the length of from 0.3 m to less than 1 m, any type of vehicle may not be expected, so that the score 0 is listed therefor. With respect to the length of less than 0.3 m, a human or any type of vehicle may not be expected, so that the score 1 is listed only for another object.

In Step S116, data in the obstacle-size evaluation list corresponding to the type and the size of the obstacle represented by the obstacle information (its size and type) is referenced. If the data is the score 1, it is determined in Step S117 that the obstacle is present (judgement is YES), and the flow moves to Step S108. If it is the score 0, it is determined in Step S117 that the obstacle is not present (judgement is NO), and the flow moves to Step S109.

In this manner, it is possible to confirm according to the size of the obstacle, whether or not the detected obstacle has been erroneously detected, by referencing the obstacle-size evaluation list in which obstacle presence possibilities are assigned to the respective types of obstacles. This makes it possible to increase the reliability of the obstacle detection to thereby restrict the obstacle responsive control from being executed unnecessarily. Since inexplicable stop and inexplicable behavior of the vehicle 1 will be restricted accordingly, the ride comfort of the vehicle 1 is improved.

3. Embodiment 3

<Processing of Vehicle Control Device>

Figure 8:
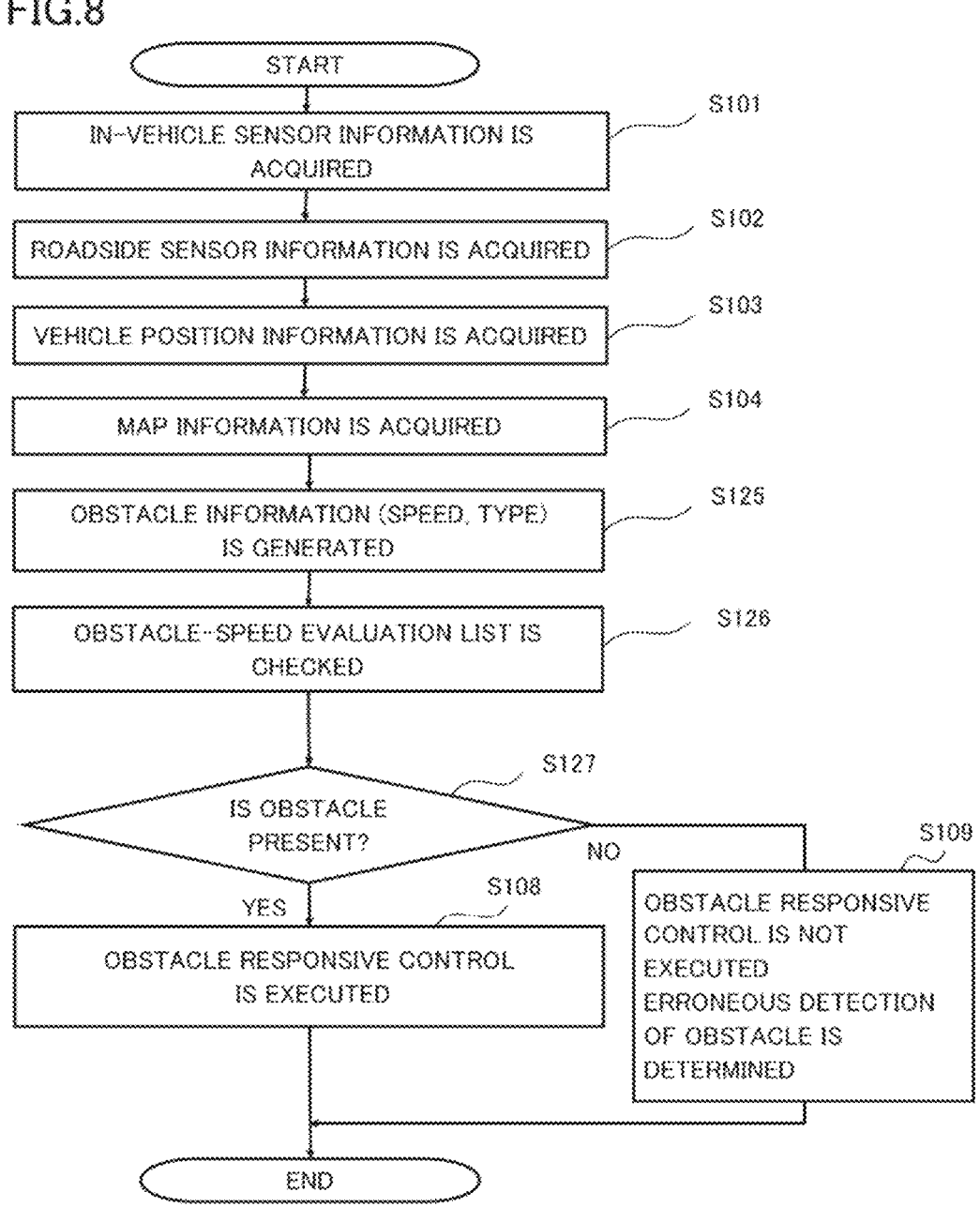
FIG. 8 is a flowchart showing processing of a vehicle control device according to Embodiment 3.

FIG. 8 is a flowchart showing processing of a vehicle control device 100 according to Embodiment 3. FIG. 9 is a table showing an obstacle-speed evaluation list according to Embodiment 3.

The processing shown in FIG. 8 is executed by the arithmetic processing device in the vehicle control device 100. The processing may be executed every fixed period of time (for example, every 1 ms). It is allowed that the processing is not executed every fixed period of time but executed in response to an event, for example, in response to the acquisition of the roadside sensor information by the roadside sensor information acquisition unit 110 of the vehicle control device 100, or the acquisition of the in-vehicle sensor information by the in-vehicle sensor information acquisition unit 120.

In the processing of FIG. 8, Steps S101 to S104, Step S108 and Step S109 are the same as those in the flowchart of FIG. 4 according to Embodiment 1, so that description thereof will be omitted. What differs from the processing of FIG. 4 is Step S125 to Step S127, so that description will be made only on the differences.

In Step S125, the information generation unit 160 generates obstacle information (its speed and type). Here, the obstacle information generation unit 160 generates information about the speed and the type of the detected obstacle on the basis of the in-vehicle sensor information, the roadside sensor information and the vehicle position information.

However, the type and the speed of the obstacle may have been already described in the in-vehicle sensor information and/or the roadside sensor information after being processed. If this is the case, the obstacle information generation unit 160 transfers the received data without change to the obstacle responsive control unit 170. Further note that, in that case, "OBSTACLE INFORMATION IS GENER- ATED" stated in Step S125 in the flowchart of FIG. 8 shall be replaced with "OBSTACLE INFORMATION IS READ OUT".

In Step S126, the obstacle-speed evaluation list 143 is checked. The obstacle-speed evaluation list to be referenced here is a list that is exemplified by FIG. 9 and in which obstacle presence possibilities for respective types of obstacles and for respective speeds of obstacles, are each indicated by a score of 1 or 0. The obstacle-speed evaluation list is also referred to as "a third obstacle-presence possibility list".

The scores of 1 and 0 listed in FIG. 9 are just an example and the listed scores shall be revised according to the situation. With respect to the types of obstacles, although the obstacles are classified into five types of a human, a three or more-wheeled vehicle, a motorcycle, a bicycle and another object, they may be classified into the number of types less than five, or may be classified into six or more types. The speeds of obstacles are classified into ranges defined using 200 km/h, 60 km/h and 30 km/h on a "no less than" or "less than" basis. The speed ranges are not limited to this example.

With respect to the speed of no less than 200 km/h, there is no human moving at that speed and it is much less frequent that any type of vehicle travels at that speed, so that the score 0 is listed therefor. With respect to the speed of no less than 60 km/h, a human or bicycle moving at that speed may not be expected, so that the score 0 is listed therefor. With respect to the other speed of no less than 30 km/h, since the types other than a human may be expected to travel at that speed, the score 1 is listed therefor. With respect to the speed of less than 30 km/h, all the types including a human may be expected to move at that speed, so that the score 1 is listed therefor.

In Step S126, data in the obstacle-speed evaluation list corresponding to the type and the speed of the obstacle represented by the obstacle information (its speed and type) is referenced. If the data is the score 1, it is determined in Step S127 that the obstacle is present (judgement is YES), and the flow moves to Step S108. If it is the score 0, it is determined in Step S127 that the obstacle is not present (judgement is NO), and the flow moves to Step S109.

In this manner, it is possible to confirm according to the speed of the obstacle, whether or not the detected obstacle has been erroneously detected, by referencing the obstacle-speed evaluation list in which obstacle presence possibilities are assigned to the respective types of obstacles. This makes it possible to increase the reliability of the obstacle detection to thereby restrict the obstacle responsive control from being executed unnecessarily. Since inexplicable stop and inexplicable behavior of the vehicle 1 will be restricted accordingly, the ride comfort of the vehicle 1 is improved.

4. Embodiment 4

<Processing of Vehicle Control Device>

FIG. 10 is a flowchart showing processing of a vehicle control device 100 according to Embodiment 4. FIG. 11 is a table showing a list of obstacle presence possibilities for respective regions and respective types of obstacles, according to Embodiment 4. FIG. 12 is a table showing an obstacle-size evaluation list according to Embodiment 4. FIG. 13 is a table showing an obstacle-speed evaluation list according to Embodiment 4.

The processing shown in FIG. 10 is executed by the arithmetic processing device in the vehicle control device 100. The processing may be executed every fixed period of time (for example, every 1 ms). It is allowed that the processing is not executed every fixed period of time but executed in response to an event, for example, in response to the acquisition of the roadside sensor information by the roadside sensor information acquisition unit 110 of the vehicle control device 100, or the acquisition of the in-vehicle sensor information by the in-vehicle sensor information acquisition unit 120.

In the processing of FIG. 10, Steps S101 to S104, Step S108 and Step S109 are the same as those in the flowchart of FIG. 4 according to Embodiment 1, so that description thereof will be omitted. What differs from the processing of FIG. 4 is Step S135 to Step S140, so that description will be made only on the differences.

In Step S135, the obstacle information generation unit 160 generates obstacle information (its position, size, speed and type). Here, the obstacle information generation unit 160 generates information about the position, the size, the speed and the type of the detected obstacle on the basis of the in-vehicle sensor information, the roadside sensor information and the vehicle position information.

However, the type and the size of the obstacle may have been already described in the in-vehicle sensor information and/or the roadside sensor information after being processed. If this is the case, the obstacle information generation unit 160 transfers the received data without change to the obstacle responsive control unit 170. Further note that, in that case, "OBSTACLE INFORMATION IS GENERATED" stated in Step S135 in the flowchart of FIG. 10 shall be replaced with "OBSTACLE INFORMATION IS READ OUT".

In Step S136, an obstacle-presence possibility list is checked to thereby determine an evaluation value P1 therefrom. The obstacle-presence possibility list to be referenced here is "a first obstacle-presence possibility list" that is exemplified by FIG. 11 and in which obstacle presence possibilities for respective types of obstacles and for respective regions, are each indicated by a score of from 1 to 0.

The scores listed in FIG. 11 are just an example and the listed scores shall be revised according to the situation. With respect to the types of obstacles, although the obstacles are classified into five types of a human, a three or more-wheeled vehicle, a motorcycle, a bicycle and another object, they may be classified into the number of types less than five, or may be classified into six or more types. The getting on/off area as one of the regions means a place that is one step higher than the road surface and that is formed for getting on/off a bus or a streetcar, provided that a waiting place provided for passengers who intend to get on a bus is included therein. With respect to the getting on/off area, there is less possibility that any type of vehicle other than a bicycle enters there, so that the score 0 is listed for said any other type of vehicle, and the score 0.1 is listed for a bicycle.

With respect to a sidewalk as one of the regions, the possibilities that a vehicle (having three or more wheels) enters there and that a motorcycle enters there, are listed as the score 0.2 and the score 0.5, respectively. However, since it is frequent that a bicycle enters there, the score 0.7 is listed therefor. With respect to a bus bay as one of the regions, there is a possibility that any type of vehicle enters there when a bus has not entered there, so that the score 1.0 is listed for a vehicle (having three or more wheels) and the score 0.5 is listed for a motorcycle, a bicycle and a human.

With respect to a refuge bay as one of the regions, the score 0.8 is listed for a human as well as for any type of vehicle. With respect to an ordinary road as one of the regions, the score 0.8 is listed for a human and the score 1.0 is listed for all types other than a human. With respect to a freeway as one of the regions, there is less possibility that a human or bicycle enters there, so that the score 0.1 is listed therefor.

In Step S137, an obstacle-size evaluation list is checked to thereby determine an evaluation value P2 therefrom. The obstacle-size evaluation list to be referenced here is "a second obstacle-presence possibility list" that is exemplified by FIG. 12 and in which obstacle presence possibilities for the respective types of obstacles and for respective sizes thereof, are each indicated by a score of from 1 to 0.

The scores listed in FIG. 12 are just an example and the listed scores shall be revised according to the situation. With respect to the types of obstacles, although the obstacles are classified into five types of a human, a three or more-wheeled vehicle, a motorcycle, a bicycle and another object, they may be classified into the number of types less than five, or may be classified into six or more types. The sizes (entire lengths) of obstacles are classified into ranges defined using 20 m, 10 m, 2.5 m, 1 m, 0.5 m and 0.3 m on a "no less than" or "less than" basis. The size ranges are not limited to this example.

With respect to the length of no less than 20 m, there is no human having such a length and it is much less frequent that any type of vehicle has such a length, so that the score 0 is listed therefor. With respect to the other length of no less than 10 m, a truck or bus may be expected, so that the score 0.5 is listed therefor; however, any type of two-wheeled vehicle or a human may not be expected, so that the score 0 is listed therefor. With respect to the length of no less than 2.5 m, it is less frequent that a human or any type of two-wheeled vehicle has such a length, so that the score 0 is listed therefor. With respect to the length of from 1 m to less than 2.5 m, both a human and any type of vehicle may be expected, so that the score 1 is listed therefor. With respect to the length of from 0.3 m to less than 1 m, any type of vehicle is not expected, so that the score 0 is listed therefor. With respect to the length of less than 0.3 m, a human or any type of vehicle is not expected, so that the score 1 is listed only for another object.

In Step S138, an obstacle-speed evaluation list is checked to thereby determine an evaluation value P3 therefrom. The obstacle-speed evaluation list to be referenced here "a is third obstacle-presence possibility list" that is exemplified by FIG. 13 and in which obstacle presence possibilities for the respective types of obstacles and for respective speeds thereof, are each indicated by a score of from 1 to 0.

The scores listed in FIG. 13 are just an example and the listed scores shall be revised according to the situation. With respect to the types of obstacles, although the obstacles are classified into five types of a human, a three or more-wheeled vehicle, a motorcycle, a bicycle and another object, they may be classified into the number of types less than five, or may be classified into six or more types. The speeds of obstacles are classified into ranges defined using 200 km/h, 60 km/h and 30 km/h on a "no less than" or "less than" basis. The speed ranges are not limited to this example.

With respect to the speed of no less than 200 km/h, there is no human moving at that speed and it is much less frequent that any type of vehicle travels at that speed, so that the score 0 is listed therefor. With respect to the speed of no less than 60 km/h, a human or bicycle moving at that speed may not be expected, so that the score 0 is listed therefor. With respect to the other speed of no less than 30 km/h, since the types other than a human may be expected to travel at that speed, the score 1 is listed therefor except that the score 0.7 is listed for a bicycle. With respect to the speed of less than 30 km/h, all the types including a human may be expected to move at that speed, so that the score 1 is listed therefor.

In Step S139, the product of P1, P2 and P3 is calculated as an evaluation value P. In Step S140, it is determined whether or not the evaluation value P is larger than a predetermined evaluation determination value Pk (Pk is, for example, 0.5). When the value P is larger than the value Pk (judgement is YES), the flow moves to Step S108. When the value P is not larger than the value Pk (judgement is NO), the flow moves to Step S109.

In this manner, the evaluation value P1 is determined as a score of from 1 to 0 that indicates one of the obstacle presence possibilities assigned to the respective types of obstacles and the respective regions. Further, the evaluation value P2 is determined as a score of from 1 to 0 that indicates one of the obstacle presence possibilities assigned to the respective types of obstacles and the respective sizes thereof. Furthermore, the evaluation value P3 is determined as a score of from 1 to 0 that indicates one of the obstacle presence possibilities assigned to the respective types of obstacles and the respective speeds thereof. Whether or not the detected obstacle has been erroneously detected can be confirmed in such a manner that the product of the evaluation values of P1, P2 and P3 is calculated to thereby determine the evaluation value P, which is then compared with the evaluation determination value Pk. This makes it possible to increase the reliability of the obstacle detection to thereby restrict the obstacle responsive control from being executed unnecessarily. Since inexplicable stop and inexplicable behavior of the vehicle 1 will be restricted accordingly, the ride comfort of the vehicle 1 is improved.

<Obstacle-Speed Evaluation List for Each Region>

In Step S138 in the flowchart shown in FIG. 10, the evaluation value P3 is determined by checking the obstacle-speed evaluation list exemplified by FIG. 13. However, an obstacle-speed evaluation list may be set for each of the regions. It is also allowed to determine a region on the basis of a position at which an obstacle is present and then to determine the evaluation value P3 from the region, the type and the speed of the obstacle.

Figures 19, 20:
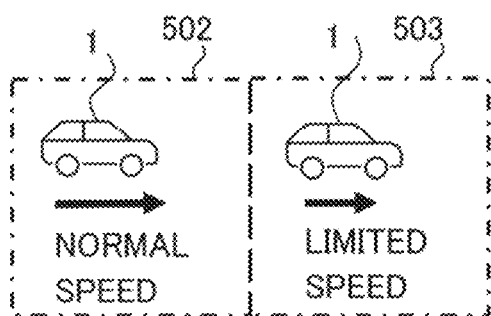
FIG. 19 is a table showing an obstacle-speed evaluation list for a freeway, according to Embodiment 4.
FIG. 20 a diagram for illustrating an example of how a vehicle speed is limited in each of regions, according to Embodiment 5.

FIG. 14 is a table showing an obstacle-speed evaluation list for a getting-on/off area, according to Embodiment 4. FIG. 15 is a table showing an obstacle-speed evaluation list for a sidewalk, according to Embodiment 4. FIG. 16 is a table showing an obstacle-speed evaluation list for a bus bay, according to Embodiment 4. FIG. 17 is a table showing an obstacle-speed evaluation list for a refuge bay, according to Embodiment 4. FIG. 18 is a table showing an obstacle-speed evaluation list for an ordinary road, according to Embodiment 4. FIG. 19 is a table showing an obstacle-speed evaluation list for a freeway, according to Embodiment 4.

In this manner, an obstacle-speed evaluation list is set for each of the regions based on obstacle presentable positions, so that it is possible to finely evaluate the obstacle presence possibility while taking into account the characteristics of the region. This makes it possible to increase the reliability of the obstacle detection to thereby adequately execute the obstacle responsive control.

<Setting of Obstacle Detection Area According to Vehicle Speed>

A maximum distance for obstacle detection may be increased in response to an increase in the speed of the vehicle 1. This is because, when the speed of the vehicle 1 increases, an approaching speed to an obstacle becomes faster, so that a margin time for taking action becomes shorter and accordingly, a more distant obstacle should be detected to thereby promptly determine whether the obstacle responsive control is necessary or not.

According to the configuration of the vehicle control device 100 illustrated in FIG. 1, the vehicle condition acquisition unit 150 acquires information of the speed of the vehicle 1. In response to an increase in the speed of the vehicle 1, an area for confirming the presence of an obstacle on the basis of the obstacle-presence possibility list, the obstacle-size evaluation list and the obstacle-speed evaluation list, may be enlarged in the obstacle information generation unit. Instead, it is allowed to request the in-vehicle sensor 101 or the roadside sensor 201 to detect a more distant obstacle.

It is expected that the detection of a more distant obstacle may be associated with an increased detection error. Further, in a region with poor visibility, there is a limit on the enlargement of the distance for obstacle detection, so that the possibility of erroneous detection increases. In that case, in order to restrict the erroneous detection of an obstacle, the speed of the vehicle 1 may be limited. This is because, if the speed of the vehicle 1 decreases, the degree of necessity to detect a more distant obstacle is reduced.

For an entry prohibited region for vehicles, such as a getting on/off area, a sidewalk or the like, and a speed restricted region for vehicles, such as a bus bay, a refuge bay or the like, the speed of the vehicle 1 may be limited. Meanwhile, such knowledge has been known that there is a special area (for example, an inside of a tunnel, a dark area at a tunnel entrance/exit or the like, or an area in which grasses, trees or the like sway, may be assumed) in which an obstacle-detection error is more likely to occur than in an ordinary area. For such a special area, as well as for an area with poor visibility even though it is an ordinary road, the speed of the vehicle 1 may be limited. Further, for a region in which an environmental change has occurred due to weather such as rain, cloud, fog or the like, the speed may be limited.

Although data for limiting the speed is stored in the map database 104, it may be included in the obstacle-presence possibility list exemplified by FIG. 5 or FIG. 11, or in the obstacle-speed evaluation lists provided for the respective regions and exemplified by FIG. 14 to FIG. 19. Further, in a manner independent of these lists, data for limiting the speed may be read out per each region. The roadside monitoring device may detect a weather change to thereby specify a limited speed per each region. This makes it possible to the restrict erroneous detection of an obstacle to thereby get reliable obstacle responsive control.

5. Embodiment 5

Figure 21:
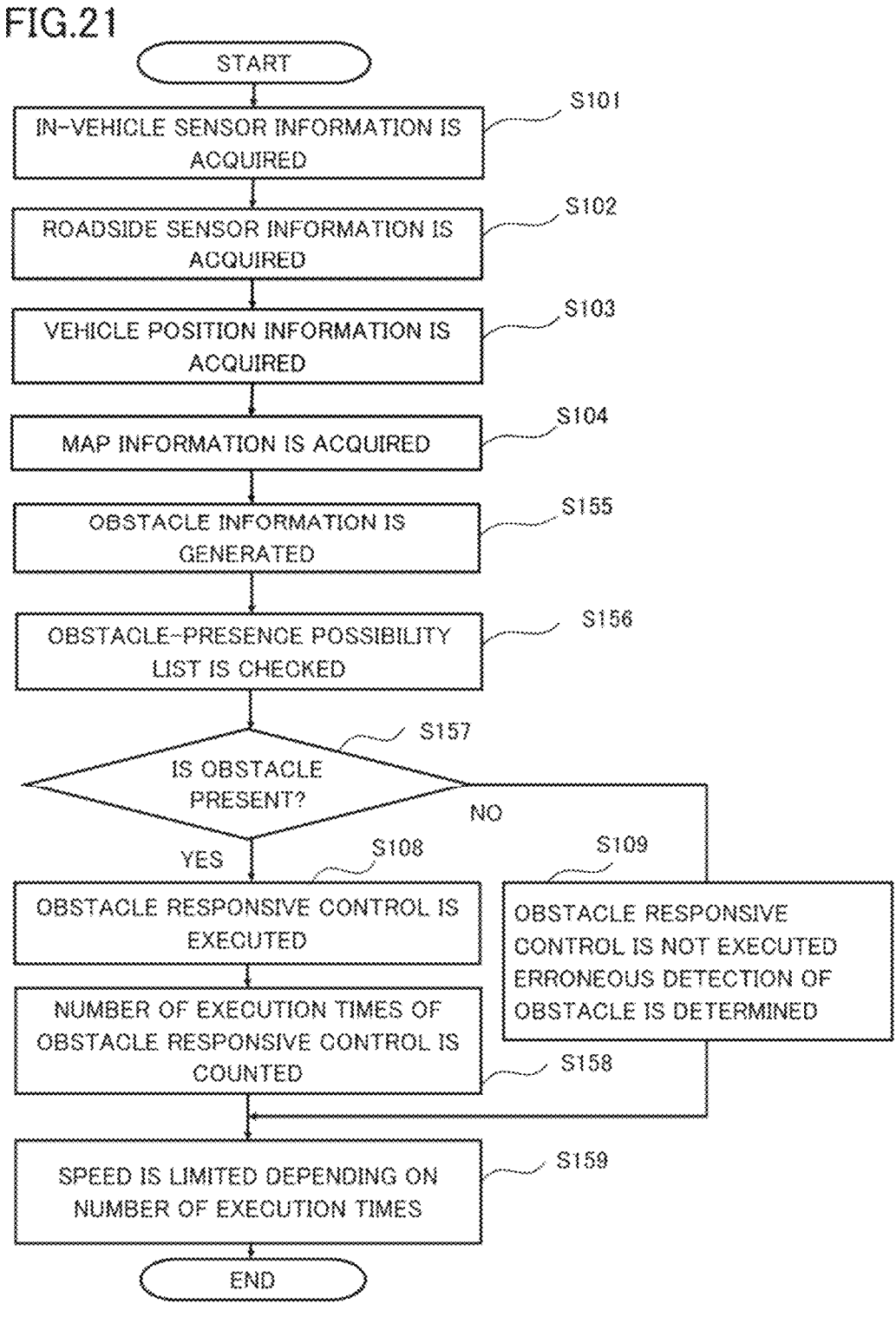
FIG. 21 is a flowchart showing processing of a vehicle control device according to Embodiment 5.

FIG. 20 is a diagram for illustrating an example of how a vehicle speed is limited in each of regions, according to Embodiment 5. FIG. 21 is a flowchart showing processing of a vehicle control device 100 according to Embodiment 5. FIG. 22 is a table showing a relationship between a number of execution times of the obstacle responsive control and a speed limit value, according to Embodiment 5.

The vehicle control device 100 according to Embodiment 5 differs from those according to Embodiments 1 to 4 in that it is provided with a function of counting, per each region, a number of execution times of the obstacle responsive control, to thereby limit the speed in a manner depending on the number of execution times of the obstacle responsive control. The region in which the number of execution times of the obstacle responsive control is large, corresponds to a region including many obstacles, so that, when the vehicle is caused to travel at the limited speed therein, it is possible to restrict the erroneous detection of an obstacle to thereby execute highly reliable obstacle responsive control. Further, since the speed is limited in a manner depending on the number of execution times of the obstacle responsive control, it is possible to avoid excessive reduction of the speed at an early stage. The speed can be limited focusing on the past record about the execution of the obstacle responsive control, by simply counting the number of execution times of the obstacle responsive control, to thereby restrict the vehicle from getting into the same situation as in the past.

In FIG. 20, because the obstacle responsive control has never executed in a region 502, the vehicle 1 travels at normal speed therein. In a region 503, the obstacle responsive control has been executed, so that a situation is illustrated in which the normal speed is limited and thus the vehicle 1 travels at the limited speed.

<Processing of Vehicle Control Device>

The processing of the flowchart shown in FIG. 21 is executed by the arithmetic processing device in the vehicle control device 100. The processing may be executed every fixed period of time (for example, every 1 ms). It is allowed that the processing is not executed every fixed period of time but executed in response to an event, for example, in response to the acquisition of the roadside sensor information by the roadside sensor information acquisition unit 110 of the vehicle control device 100, or the acquisition of the in-vehicle sensor information by the in-vehicle sensor information acquisition unit 120.

In the processing of FIG. 21, Steps S101 to S104, Step S108 and Step S109 are the same as those in the flowchart of FIG. 4 according to Embodiment 1, so that description thereof will be omitted. Steps S155 to S157 in FIG. 21 may be replaced with one of: Steps S105 to S107 in FIG. 4 according to Embodiment 1; Steps S115 to S117 in FIG. 6 according to Embodiment 2; Steps S125 to S127 in FIG. 8 according to Embodiment 3; and Steps S135 to S140 in FIG. 10 according to Embodiment 4.

In Step S158 shown in FIG. 21, the number of execution times of the obstacle responsive control in the region in which an obstacle is detected, is counted. Then, in Step S159, the number of execution times of the obstacle responsive control is read out, to thereby limit the speed on the basis of the relationship between the number of execution times of the obstacle responsive control and the speed limit value shown in FIG. 22. Note that the numbers of execution times of the obstacle responsive control and the speed limit values shown in FIG. 22 are just an example, and thus the speed limit values may be changed to optimum values through an experiment or the like.

6. Embodiment 6

Figure 23:
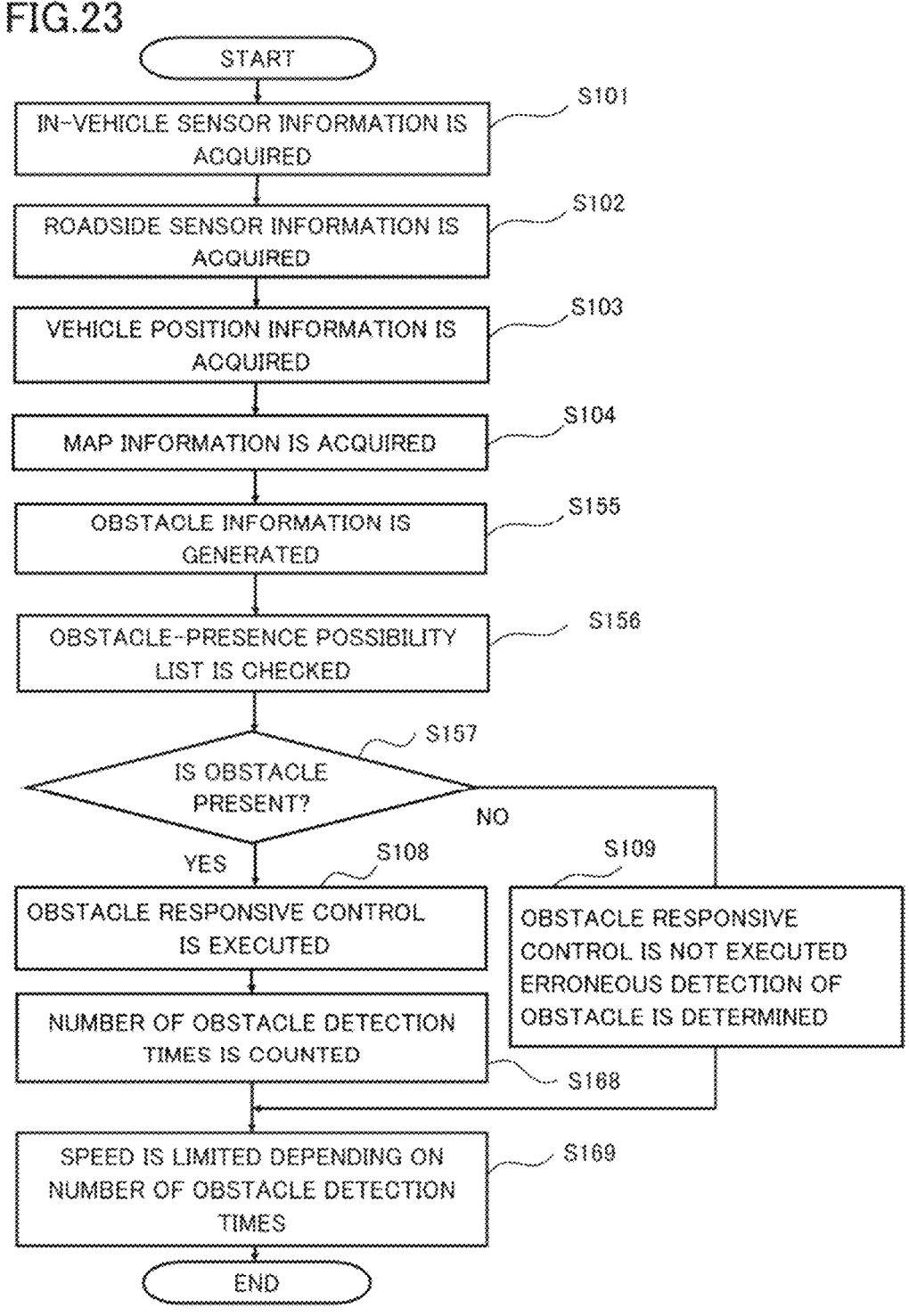
FIG. 23 is a flowchart showing processing of a vehicle control device according to Embodiment 6.

FIG. 23 is a flowchart showing processing of a vehicle control device 100 according to Embodiment 6. FIG. 24 is a table showing a relationship between a number of obstacle detection times and a speed limit value, according to Embodiment 6.

The vehicle control device 100 according to Embodiment 6 differs from that according to Embodiment 5 in that it is provided with a function of counting, per each region, a number of obstacle detection times, to thereby limit the speed in a manner depending on the number of obstacle detection times. The region in which the number of obstacle detection times is large is a region in which obstacle detection including erroneous detection has been executed many times, so that, when the vehicle is caused to travel at the limited speed therein, it is possible to restrict the erroneous detection of an obstacle and to restrict unnecessary obstacle avoidance control, to thereby execute highly reliable obstacle responsive control. Further, since the speed is limited in a manner depending on the number of obstacle detection times, it is possible to avoid excessive reduction of the speed at an early stage. The speed can be limited focusing on the past record about the detection of obstacles including erroneous detection, by simply counting the number of obstacle detection times, to thereby restrict the vehicle from getting into the same situation as in the past.

<Processing of Vehicle Control Device>

The processing of the flowchart shown in FIG. 23 is executed by the arithmetic processing device in the vehicle control device 100. The processing may be executed every fixed period of time (for example, every 1 ms). It is allowed that the processing is not executed every fixed period of time but executed in response to an event, for example, in response to the acquisition of the roadside sensor information by the roadside sensor information acquisition unit 110 of the vehicle control device 100, or the acquisition of the in-vehicle sensor information by the in-vehicle sensor information acquisition unit 120.

The processing of FIG. 23 results from changing Steps S158 and S159 in FIG. 21 according to Embodiment 5 to Steps S168 and S169, and the other steps are the same as in FIG. 21. Thus, description will be made only on the differences.

In Step S168 shown in FIG. 23, the number of obstacle detection times in the region in which an obstacle is detected, is counted. Then, in Step S169, the number of obstacle detection times is read out, to thereby limit the speed on the basis of the relationship between the number of obstacle detection times and the speed limit value shown in FIG. 24. Note that the numbers of obstacle detection times and the speed limit values shown in FIG. 24 are just an example, and thus the speed limit values may be changed to optimum values through an experiment or the like.

7. Embodiment 7

Figure 25:
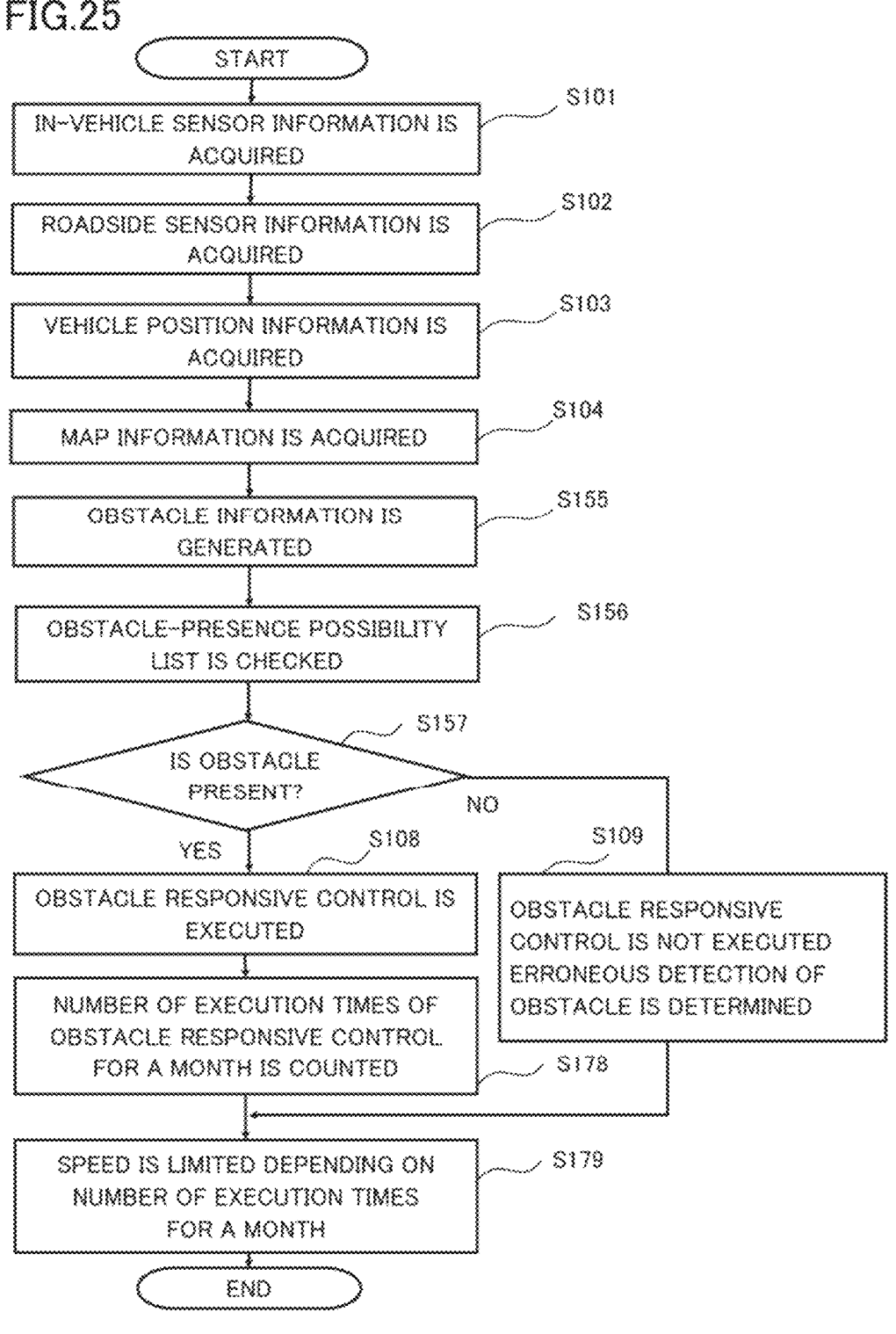
FIG. 25 is a flowchart showing processing of a vehicle control device according to Embodiment 7.

FIG. 25 is a flowchart showing processing of a vehicle control device 100 according to Embodiment 7. FIG. 26 is a table showing a relationship between a number of execution times of the obstacle responsive control for a month and a speed limit value, according to Embodiment 7.

The vehicle control device 100 according to Embodiment 7 differs from that according to Embodiment 5 in that it is provided with a function of counting, per each region, a number of execution times of the obstacle responsive control for a predetermined count period, to thereby limit the speed in a manner depending on the number of execution times of the obstacle responsive control for said count period. The region in which the number of execution times of the obstacle responsive control for the count period is large, is a region in which the execution of the obstacle responsive control is frequent, so that, when the vehicle is caused to travel at the limited speed therein, it is possible to restrict the erroneous detection of an obstacle, to thereby execute highly reliable obstacle responsive control. Further, since the speed is limited in a manner depending on the number of execution times of the obstacle responsive control for the counting period, it is possible to take action suited to the latest situation. It is also possible to avoid excessive reduction of the speed due to the influence of past history.

<Processing of Vehicle Control Device>

The processing of the flowchart shown in FIG. 25 is executed by the arithmetic processing device in the vehicle control device 100. The processing may be executed every fixed period of time (for example, every 1 ms). It is allowed that the processing is not executed every fixed period of time but executed in response to an event, for example, in response to the acquisition of the roadside sensor information by the roadside sensor information acquisition unit 110 of the vehicle control device 100, or the acquisition of the in-vehicle sensor information by the in-vehicle sensor information acquisition unit 120.

The processing of FIG. 25 results from changing Steps S158 and S159 in FIG. 21 according to Embodiment 5 to Steps S178 and S179, and the other steps are the same as in FIG. 21. Thus, description will be made only on the differences.

In Step S178 shown in FIG. 25, the number of execution times of the obstacle responsive control for a month is counted. Then, in Step S179, the number of execution times of the obstacle responsive control for a month is read out, to thereby limit the speed on the basis of the relationship between the number of execution times of the obstacle responsive control for a month and the speed limit value shown in FIG. 26. Note that the numbers of execution times of the obstacle responsive control for a month and the speed limit values shown in FIG. 26 are just an example, and thus the speed limit values may be changed to optimum values through an experiment or the like. Further, in FIGS. 25 and 26, the count period is set to one month; however, the number of execution times for a week, for a day or for a given time slot may instead be counted.

8. Embodiment 8

Figure 27:
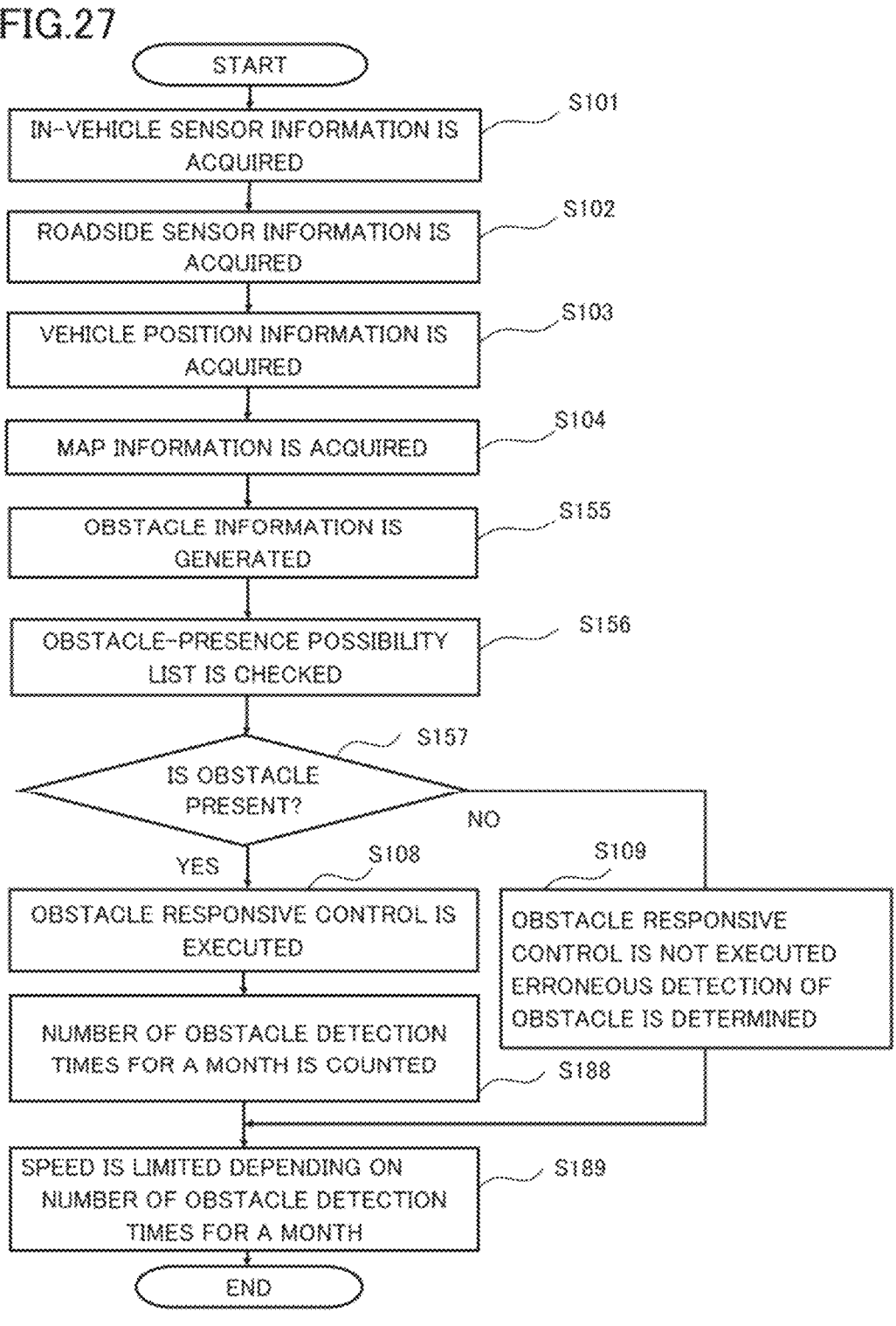
FIG. 27 is a flowchart showing processing of a vehicle control device according to Embodiment 8.

FIG. 27 is a flowchart showing processing of a vehicle control device 100 according to Embodiment 8. FIG. 28 is a table showing a relationship between a number of obstacle detection times for a month and a speed limit value, according to Embodiment 8.

The vehicle control device 100 according to Embodiment 8 differs from that according to Embodiment 7 in that it is provided with a function of counting, per each region, a number of obstacle detection times for a predetermined count period, to thereby limit the speed in a manner depending on the number of obstacle detection times for said count period. The region in which the number of obstacle detection times for the count period is large, is a region in which the occurrence of obstacle detection including erroneous detection is frequent, so that, when the vehicle is caused to travel at the limited speed therein, it is possible to restrict the erroneous detection of an obstacle and to restrict unnecessary obstacle avoidance control, to thereby execute highly reliable obstacle responsive control. Further, since the speed is limited in a manner r depending on the number of obstacle detection times for the count period, it is possible to take action suited to the latest situation. It is also possible to avoid excessive reduction of the speed due to the influence of past history about the erroneous detection.

<Processing of Vehicle Control Device>

The processing of the flowchart shown in FIG. 27 is executed by the arithmetic processing device in the vehicle control device 100. The processing may be executed every fixed period of time (for example, every 1 ms). It is allowed that the processing is not executed every fixed period of time but executed in response to an event, for example, in response to the acquisition of the roadside sensor information by the roadside sensor information acquisition unit 110 of the vehicle control device 100, or the acquisition of the in-vehicle sensor information by the in-vehicle sensor information acquisition unit 120.

The processing of FIG. 27 results from changing Steps S158 and S159 in FIG. 21 according to Embodiment 5 to Steps S188 and S189, and the other steps are the same as in FIG. 21. Thus, description will be made only on the differences.

In Step S188 shown in FIG. 27, the number of obstacle detection times for a month is counted. Then, in Step S189, the number of obstacle detection times for a month is read out, to thereby limit the speed on the basis of the relationship between the number of obstacle detection times for a month and the speed limit value shown in FIG. 28. Note that the numbers of obstacle detection times for a month and the speed limit values shown in FIG. 28 are just an example, and thus the speed limit values may be changed to optimum values through an experiment or the like. Further, in FIGS. 27 and 28, the count period is set to one month; however, the number of the detection times for a week, for a day or for a given time slot may instead be counted.

In this disclosure, a variety of exemplary embodiments and examples are described; however, every characteristic, configuration or function that is described in one or more embodiments, is not limited to being applied to a specific embodiment, and may be applied singularly or in any of various combinations thereof to another embodiment. Accordingly, an infinite number of modified examples that are not exemplified here are supposed within the technical scope disclosed here. For example, such cases shall be included where at least one configuration element is modified; where at least one configuration element is added or omitted; and furthermore, where at least one configuration element is extracted and combined with a configuration element of another embodiment.

Various embodiments disclosed above are summarized in the following appendices.

Appendix 1

A vehicle control device, comprising:

an in-vehicle sensor information acquisitor that acquires information from an in-vehicle sensor that is provided in a vehicle to detect an obstacle around the vehicle;

a roadside sensor information acquisitor that acquires information from a roadside sensor that is placed on a roadside to detect an obstacle therearound;

a vehicle position information acquisitor that acquires position information of the vehicle;

a map information acquisitor that acquires map information around the vehicle on a basis of the position information of the vehicle acquired by the vehicle position information acquisitor;

an obstacle information generator that generates obstacle information including information of at least one of a position, a size and a speed of the obstacle and information of a type of the obstacle, on a basis of in-vehicle sensor information as the information acquired by the in-vehicle sensor information acquisitor, roadside sensor information as the information acquired by the roadside-sensor information acquisitor, and vehicle position information as the information acquired by the vehicle position information acquisitor; and an obstacle responsive controller that determines whether or not to execute obstacle responsive control, on a basis of the obstacle information generated by the obstacle information generator and at least one obstacle-presence possibility list in which obstacle presence possibilities are assigned to respective types of obstacles, and then, when determined to execute the obstacle responsive control, controls the vehicle in response to the obstacle.

Appendix 2

The vehicle control device as set forth in Appendix 1, wherein the obstacle information generator generates the obstacle information including the information of the position and the type of the obstacle, and wherein the obstacle responsive controller determines whether or not to execute the obstacle responsive control, on the basis of a first obstacle-presence possibility list as said obstacle-presence possibility list which is included in the map information and in which, for each of regions, obstacle presence possibilities are assigned to the respective types of obstacles, and then, when determined to execute the obstacle responsive control, controls the vehicle in response to the obstacle.

Appendix 3

The vehicle control device as set forth in any one of Appendixes 1 and 2, wherein the obstacle information generator generates the obstacle information including the information of the size and the type of the obstacle, and wherein the obstacle responsive controller determines whether or not to execute the obstacle responsive control, on the basis of a second obstacle-presence possibility list as said obstacle-presence possibility list in which, for each of obstacle sizes, obstacle presence possibilities are assigned to the respective types of obstacles, and then, when determined to execute the obstacle responsive control, controls the vehicle in response to the obstacle.

Appendix 4

The vehicle control device as set forth in any one of Appendixes 1 to 3, wherein the obstacle information generator generates the obstacle information including the information of the speed and the type of the obstacle, and wherein the obstacle responsive controller determines whether or not to execute the obstacle responsive control, on the basis of a third obstacle-presence possibility list as said obstacle-presence possibility list in which, for each of obstacle speeds, obstacle presence possibilities are assigned to the respective types of obstacles, and then, when determined to execute the obstacle responsive control, controls the vehicle in response to the obstacle.

Appendix 5

The vehicle control device as set forth in any one of Appendixes 1 to 4, wherein the obstacle information generator generates the obstacle information including the information of the position, the speed and the type of the obstacle, and wherein the obstacle responsive controller determines whether or not to execute the obstacle responsive control, on the basis of a third obstacle-presence possibility list as said obstacle-presence possibility list which is included in the map information and in which, for each of regions and for each of obstacle speeds, obstacle presence possibilities are assigned to the respective types of obstacles, and then, when determined to execute the obstacle responsive control, controls the vehicle in response to the obstacle.

Appendix 6

The vehicle control device as set forth in any one of Appendixes 1 to 5,
    wherein the obstacle information generator generates the obstacle information including the information of the position, the size, the speed and the type of the obstacle, and
    wherein the obstacle responsive controller:
    calculates a first evaluation value that evaluates how necessary the obstacle-responsive control is, on a basis of a first obstacle-presence possibility list as said obstacle-presence possibility list which is included in the map information and in which, for each of regions, obstacle presence possibilities are assigned to the respective types of obstacles;
    calculates a second evaluation value that evaluates how necessary the obstacle-responsive control is, on the basis of a second obstacle-presence possibility list as said obstacle-presence possibility list in which, for each of obstacle sizes, obstacle presence possibilities are assigned to the respective types of obstacles;
    calculates a third evaluation value that evaluates how necessary the obstacle-responsive control is, on the basis of a third obstacle-presence possibility list as said obstacle-presence possibility list in which, for each of obstacle speeds, obstacle presence possibilities are assigned to the respective types of obstacles;
    determines whether or not a product of the first evaluation value, the second evaluation value and the third evaluation value is larger than a predetermined evaluation determination value; and
    determines to execute the obstacle-responsive control when the product of the first evaluation value, the second evaluation value and the third evaluation value is larger than the predetermined evaluation determination value, to thereby control the vehicle in response to the obstacle.

Appendix 7

The vehicle control device as set forth in any one of Appendixes 1 to 6, wherein the obstacle responsive controller determines whether or not to execute the obstacle: responsive control, on the basis of the obstacle information generated by the obstacle information generator and the obstacle-presence possibility list in which obstacle presence possibilities are assigned to the respective types of obstacles, and when determined not to execute the obstacle responsive control, determines that the obstacle has been detected erroneously.

Appendix 8

The vehicle control device as set forth in any one of Appendix 1 to 7, further comprising a vehicle speed detector that detects a speed of the vehicle,
    wherein the obstacle responsive controller increases a maximum distance to obstacles that allows said controller to determine whether or not to execute the obstacle responsive control, as the speed of the vehicle becomes larger.

Appendix 9

The vehicle control device as set forth in Appendix 8, wherein the obstacle responsive controller limits the speed of the vehicle in accordance with one of speeds included in the map information and preassigned to the respective regions.

Appendix 10

The vehicle control device as set forth in any one of Appendix 1 to 9, wherein the obstacle responsive controller counts, per each of the regions, a number of times that it has determined to execute the obstacle responsive control, and then limits a traveling speed of the vehicle, per each of the regions, in response to an increase in a number of times that it has controlled the vehicle in response to the obstacle.

Appendix 11

The vehicle control device as set forth in any one of Appendix 1 to 9, wherein the obstacle responsive controller counts, per each of the regions, a number of times that the obstacle information has been generated by the obstacle information generator, and then limits a traveling speed of the vehicle, per each of the regions, in response to an increase in a number of times that the obstacle information has been generated.

Appendix 12

The vehicle control device as set forth in any one of Appendix 1 to 9, wherein the obstacle responsive controller counts, per each of the regions, a number of times that it has determined to execute the obstacle responsive control, for a predetermined count period, and then limits a traveling speed of the vehicle, per each of the regions, in response to an increase in a number of times that it has controlled the vehicle in response to the obstacle for the predetermined count period.

Appendix 13

The vehicle control device as set forth in any one of Appendix 1 to 9, wherein the obstacle responsive controller counts, per each of regions, a number of times that the obstacle information has been generated by the obstacle information generator, for a predetermined count period, and then limits a traveling speed of the vehicle, per each of the regions, in response to an increase in a number of times that the obstacle information has been generated for the predetermined count period.

What is claimed is:
1. A vehicle control device, comprising:
    an in-vehicle sensor information acquisitor that acquires information from an in-vehicle sensor that is provided in a vehicle to detect an obstacle around the vehicle;
    a roadside sensor information acquisitor that acquires information from a roadside sensor that is placed on a roadside to detect an obstacle therearound;
    a vehicle position information acquisitor that acquires position information of the vehicle;

a map information acquisitor that acquires map information around the vehicle on a basis of the position information of the vehicle acquired by the vehicle position information acquisitor;

an obstacle information generator that generates obstacle information including information of at least one of a position, a size and a speed of the obstacle and information of a type of the obstacle, on a basis of in-vehicle sensor information as the information acquired by the in-vehicle sensor information acquisitor, roadside sensor information as the information acquired by the roadside sensor information acquisitor, and vehicle position information as the information acquired by the vehicle position information acquisitor; and an obstacle responsive controller that determines whether or not to execute obstacle responsive control, on a basis of the obstacle information generated by the obstacle information generator and at least one obstacle-presence possibility list in which obstacle presence possibilities are assigned to respective types of obstacles, and then, when determined to execute the obstacle responsive control, controls the vehicle in response to the obstacle.

2. The vehicle control device as set forth in claim 1,
wherein the obstacle information generator generates the obstacle information including the information of the position and the type of the obstacle, and
wherein the obstacle responsive controller determines whether or not to execute the obstacle responsive control, on the basis of a first obstacle-presence possibility list as said obstacle-presence possibility list which is included in the map information and in which, for each of regions, obstacle presence possibilities are assigned to the respective types of obstacles, and then, when determined to execute the obstacle responsive control, controls the vehicle in response to the obstacle.

3. The vehicle control device as set forth in claim 1,
wherein the obstacle information generator generates the obstacle information including the information of the size and the type of the obstacle, and
wherein the obstacle responsive controller determines whether or not to execute the obstacle responsive control, on the basis of a second obstacle-presence possibility list as said obstacle-presence possibility list in which, for each of obstacle sizes, obstacle presence possibilities are assigned to the respective types of obstacles, and then, when determined to execute the obstacle responsive control, controls the vehicle in response to the obstacle.

4. The vehicle control device as set forth in claim 1,
wherein the obstacle information generator generates the obstacle information including the information of the speed and the type of the obstacle, and
wherein the obstacle responsive controller determines whether or not to execute the obstacle responsive control, on the basis of a third obstacle-presence possibility list as said obstacle-presence possibility list in which, for each of obstacle speeds, obstacle presence possibilities are assigned to the respective types of obstacles, and then, when determined to execute the obstacle responsive control, controls the vehicle in response to the obstacle.

5. The vehicle control device as set forth in claim 1,
wherein the obstacle information generator generates the obstacle information including the information of the position, the speed and the type of the obstacle, and wherein the obstacle responsive controller determines whether or not to execute the obstacle responsive control, on the basis of a third obstacle-presence possibility list as said obstacle-presence possibility list which is included in the map information and in which, for each of regions and for each of obstacle speeds, obstacle presence possibilities are assigned to the respective types of obstacles, and then, when determined to execute the obstacle responsive control, controls the vehicle in response to the obstacle.

6. The vehicle control device as set forth in claim 1,
wherein the obstacle information generator generates the obstacle information including the information of the position, the size, the speed and the type of the obstacle, and
wherein the obstacle responsive controller:
calculates a first evaluation value that evaluates how necessary the obstacle-responsive control is, on a basis of a first obstacle-presence possibility list as said obstacle-presence possibility list which is included in the map information and in which, for each of regions, obstacle presence possibilities are assigned to the respective types of obstacles;
calculates a second evaluation value that evaluates how necessary the obstacle-responsive control is, on the basis of a second obstacle-presence possibility list as said obstacle-presence possibility list in which, for each of obstacle sizes, obstacle presence possibilities are assigned to the respective types of obstacles;
calculates a third evaluation value that evaluates how necessary the obstacle-responsive control is, on the basis of a third obstacle-presence possibility list as said obstacle-presence possibility list in which, for each of obstacle speeds, obstacle presence possibilities are assigned to the respective types of obstacles;
determines whether or not a product of the first evaluation value, the second evaluation value and the third evaluation value is larger than a predetermined evaluation determination value; and
determines to execute the obstacle-responsive control when the product of the first evaluation value, the second evaluation value and the third evaluation value is larger than the predetermined evaluation determination value, to thereby control the vehicle in response to the obstacle.

7. The vehicle control device as set forth in claim 1,
wherein the obstacle responsive controller determines whether or not to execute the obstacle responsive control, on the basis of the obstacle information generated by the obstacle information generator and the obstacle-presence possibility list in which obstacle presence possibilities are assigned to the respective types of obstacles, and when determined not to execute the obstacle responsive control, determines that the obstacle has been detected erroneously.

8. The vehicle control device as set forth in claim 1,
further comprising a vehicle speed detector that detects a speed of the vehicle,
wherein the obstacle responsive controller increases a maximum distance to obstacles that allows said controller to determine whether or not to execute the obstacle responsive control, as the speed of the vehicle becomes larger.

9. The vehicle control device as set forth in claim 8,
wherein the obstacle responsive controller limits the speed of the vehicle in accordance with one of speeds included in the map information and preassigned to respective regions.

10. The vehicle control device as set forth in claim 1, wherein the obstacle responsive controller counts, per each of regions, a number of times that it has determined to execute the obstacle responsive control, and then limits a traveling speed of the vehicle, per each of the regions, in response to an increase in a number of times that it has controlled the vehicle in response to the obstacle.

11. The vehicle control device as set forth in claim 1, wherein the obstacle responsive controller counts, per each of regions, a number of times that the obstacle information has been generated by the obstacle information generator, and then limits a traveling speed of the vehicle, per each of the regions, in response to an increase in a number of times that the obstacle information has been generated.

12. The vehicle control device as set forth in claim 1, wherein the obstacle responsive controller counts, per each of regions, a number of times that it has determined to execute the obstacle responsive control, for a predetermined count period, and then limits a traveling speed of the vehicle, per each of the regions, in response to an increase in a number of times that it has controlled the vehicle in response to the obstacle for the predetermined count period.

13. The vehicle control device as set forth in claim 1, wherein the obstacle responsive controller counts, per each of regions, a number of times that the obstacle information has been generated by the obstacle information generator, for a predetermined count period, and then limits a traveling speed of the vehicle, per each of the regions, in response to an increase in a number of times that the obstacle information has been generated for the predetermined count period.

\* \* \* \* \*